(12) United States Patent
Lin

(10) Patent No.: US 11,943,763 B2
(45) Date of Patent: Mar. 26, 2024

(54) METHOD AND APPARATUS FOR DISTRIBUTED RESOURCE ALLOCATION IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 126 days.

(21) Appl. No.: 17/395,971

(22) Filed: Aug. 6, 2021

(65) Prior Publication Data

US 2022/0046670 A1 Feb. 10, 2022

Related U.S. Application Data

(60) Provisional application No. 63/062,043, filed on Aug. 6, 2020.

(51) Int. Cl.
*H04W 72/12* (2023.01)
*H04L 5/00* (2006.01)
*H04W 72/0453* (2023.01)
*H04W 72/1268* (2023.01)

(52) U.S. Cl.
CPC ....... *H04W 72/1268* (2013.01); *H04L 5/0012* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2019/0313377 | A1* | 10/2019 | Abdoli | H04L 27/2614 |
| 2019/0349149 | A1* | 11/2019 | Nam | H04L 5/0053 |
| 2021/0044383 | A1* | 2/2021 | Sarkis | H04L 1/0071 |
| 2021/0136796 | A1 | 5/2021 | Seo et al. | |
| 2021/0286045 | A1* | 9/2021 | Bayesteh | G01S 7/006 |
| 2022/0191081 | A1* | 6/2022 | Kim | H04L 5/0094 |
| 2023/0041603 | A1* | 2/2023 | Cirik | H04B 7/0695 |

FOREIGN PATENT DOCUMENTS

KR 20200082035 A 7/2020

OTHER PUBLICATIONS

Corresponding Korean Patent Application No. 10-2021-0103860, Office Action dated May 15, 2023, English translation, 14 pages.

* cited by examiner

*Primary Examiner* — Kodzovi Acolatse
(74) *Attorney, Agent, or Firm* — Cooper Legal Group LLC

(57) ABSTRACT

A method and apparatus are disclosed. In an example from the perspective of a base station, the base station transmits a configuration of a bandwidth part to a User Equipment (UE). The base station determines a subset of frequency resources within the bandwidth part. The base station transmits, to the UE, an indication of one or more allocated resources, within the subset of frequency resources, for a transmission. The base station does not enable interleaved mapping for the transmission.

21 Claims, 10 Drawing Sheets

METHOD AND APPARATUS FOR DISTRIBUTED RESOURCE ALLOCATION IN A WIRELESS COMMUNICATION SYSTEM

CROSS-REFERENCE TO RELATED APPLICATIONS

The present Application claims the benefit of U.S. Provisional Patent Application Ser. No. 63/062,043 filed on Aug. 6, 2020, the entire disclosure of which is incorporated herein in its entirety by reference.

FIELD

This disclosure generally relates to wireless communication networks, and more particularly, to a method and apparatus for distributed resource allocation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a base station, the base station transmits a configuration of a bandwidth part to a User Equipment (UE). The base station determines a subset of frequency resources within the bandwidth part. The base station transmits, to the UE, an indication of one or more allocated resources, within the subset of frequency resources, for a transmission, wherein the base station does not enable interleaved mapping for the transmission.

In an example from the perspective of a UE, the UE receives a configuration of a bandwidth part from a base station. The UE determines a subset of frequency resources within the bandwidth part. The UE receives an indication of one or more allocated resources, within the subset of frequency resources, for a Physical Uplink Control Channel (PUCCH) transmission, wherein the UE does not enable interleaved mapping for the PUCCH transmission.

In an example from the perspective of a UE, the UE receives a configuration of a bandwidth part from a base station. The UE determines a subset of frequency resources within the bandwidth part. The UE receives an indication of one or more allocated resources, within the subset of frequency resources, for a transmission. The UE determines an interleaved mapping for the transmission based on the subset of frequency resources.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.211 V15.7.0, "NR physical channels and modulation"; 3GPP TS 38.213 V16.2.0, "NR Physical layer procedures for control"; 3GPP TS 38.331 v16.0.0, "NR RRC specification"; 3GPP TS 38.214 V16.2.0, "NR Physical layer procedures for data"; RP-193259, "New SID: Study on supporting NR from 52.6 GHz to 71 GHz". The standards and documents listed above are hereby expressly incorporated by reference in their entirety.

Figure 1:
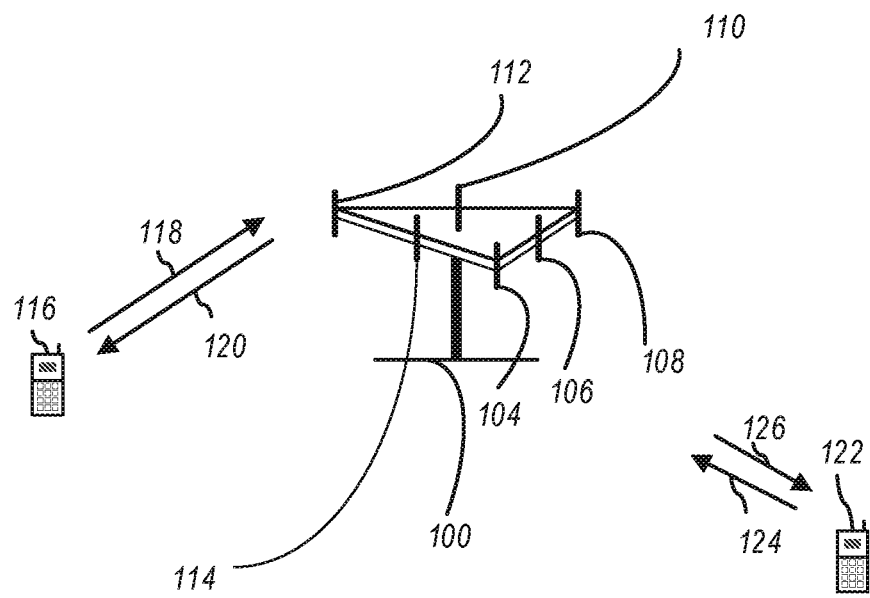
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
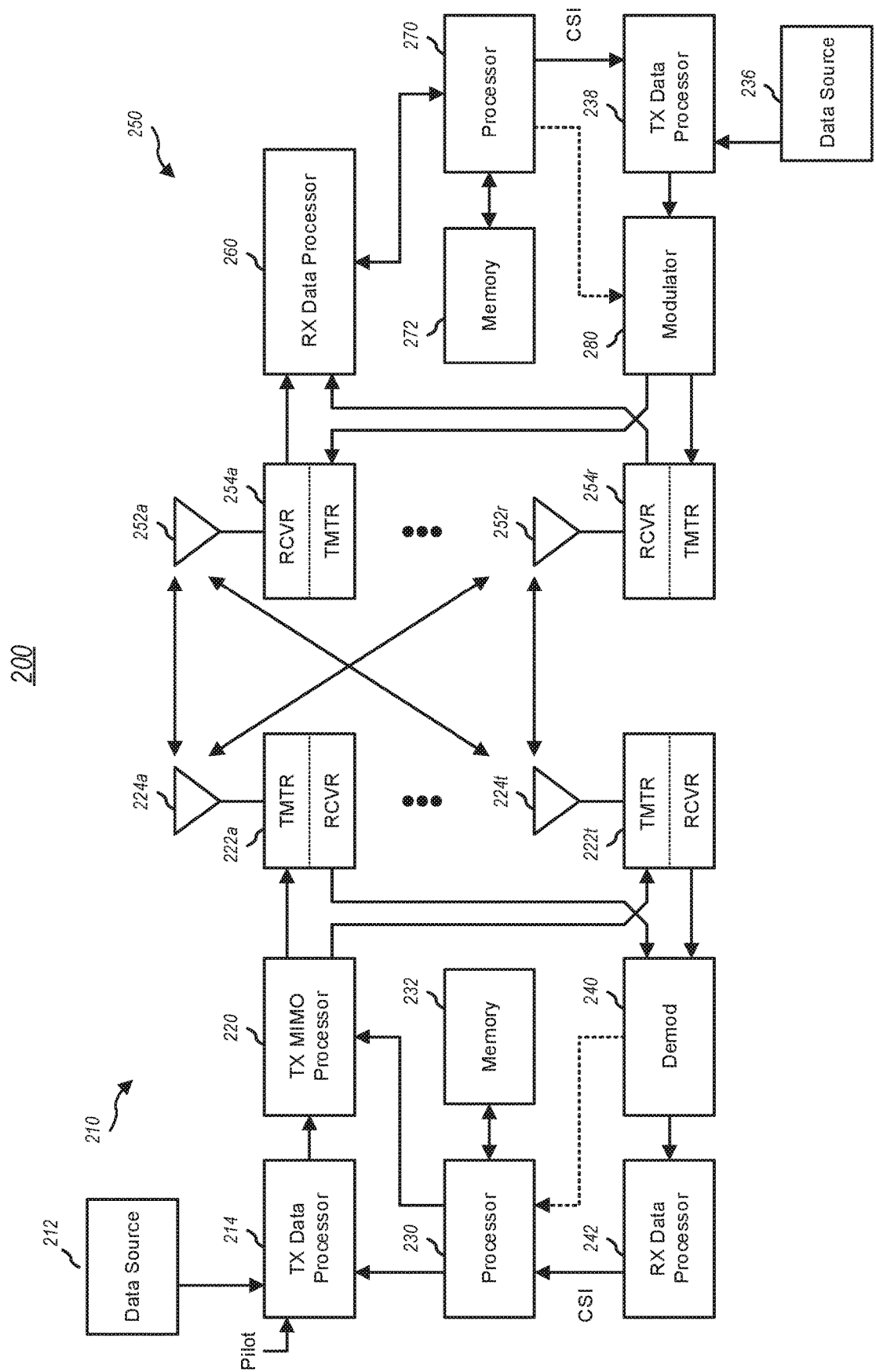
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
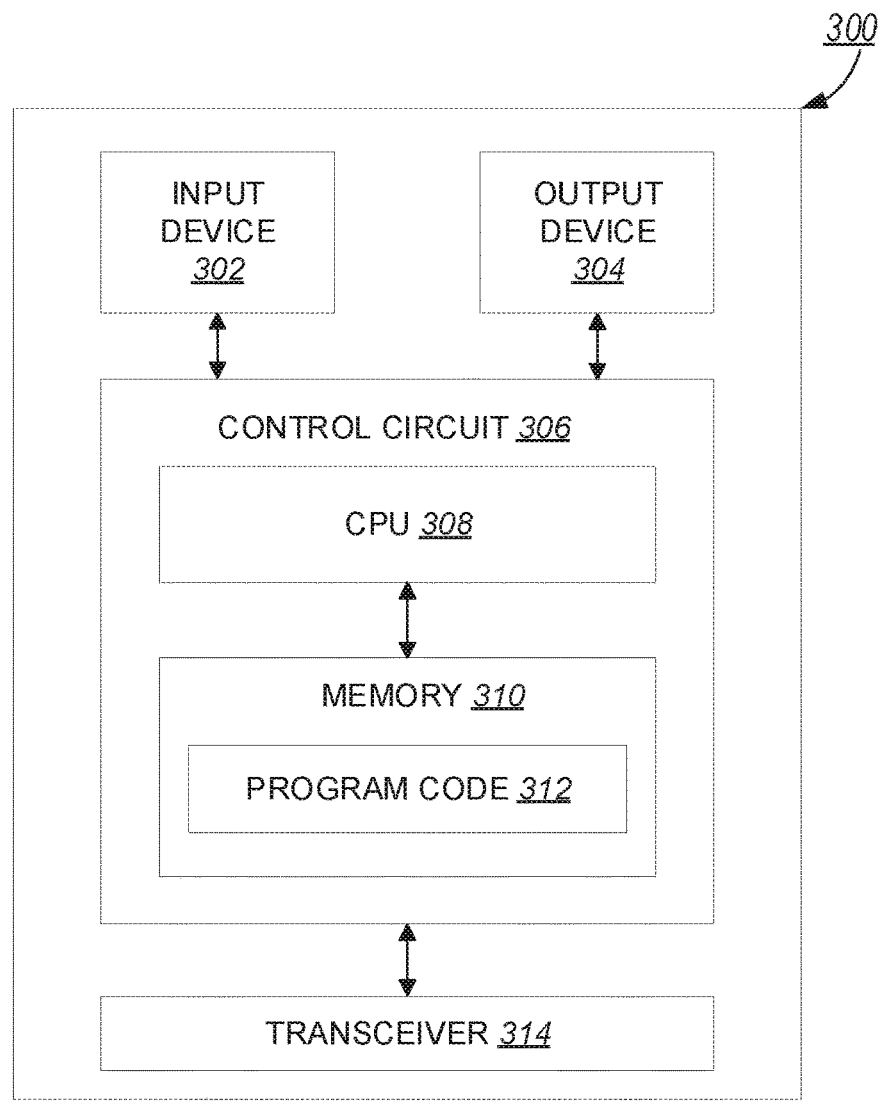
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
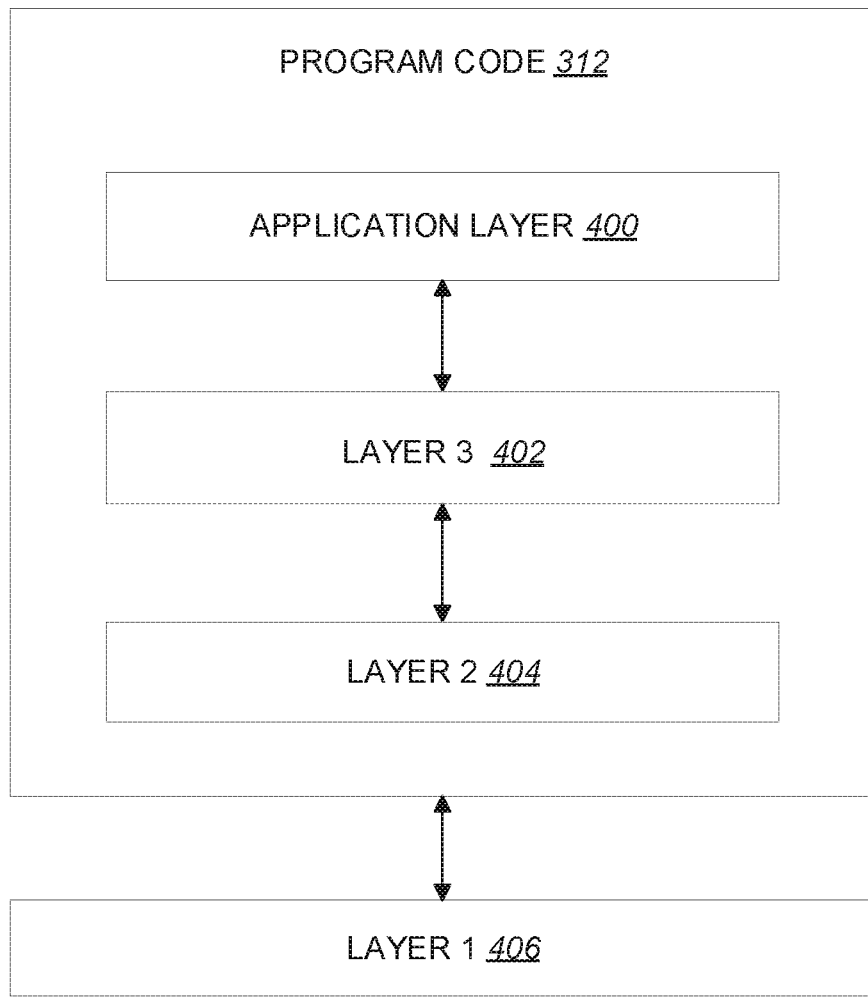
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

One or more frame structures associated with Radio Access Technology (RAT) and/or New RAT (NR) (associated with 5G) may accommodate various requirements associated with time resources and/or frequency resources (e.g., ultra-low latency (e.g., ~0.5 ms)) to delay-tolerant traffic for Machine Type Communication (MTC), from a high peak rate for enhanced Mobile Broadband (eMBB) to a very low data rate for MTC.

Numerology may be adjusted such that reducing a symbol number of a Transmission Time Interval (TTI) is not the only way to change TTI length. In an example associated with LTE numerology, 14 Orthogonal Frequency Division Multiplexing (OFDM) symbols may be associated with 1 ms and/or a subcarrier spacing of 15 KHz. When the subcarrier spacing increases to 30 KHz, where a Fast Fourier Transform (FFT) size and/or a cyclic prefix (CP) structure may not change, there may be 28 OFDM symbols in 1 ms and/or the TTI may become 0.5 ms if the number of OFDM symbol in a TTI is kept the same. Accordingly, a design between different TTI lengths may be kept common, with scalability performed on the subcarrier spacing. One or more of FFT size, Physical Resource Block (PRB) definition/number, CP design, supportable system bandwidth, subcarrier spacing selection, etc. may be configured in association with subcarrier spacing selection. As NR is associated with a larger system bandwidth and/or a larger coherence bandwidth, inclusion of a larger subcarrier spacing may be beneficial.

Figure 5:
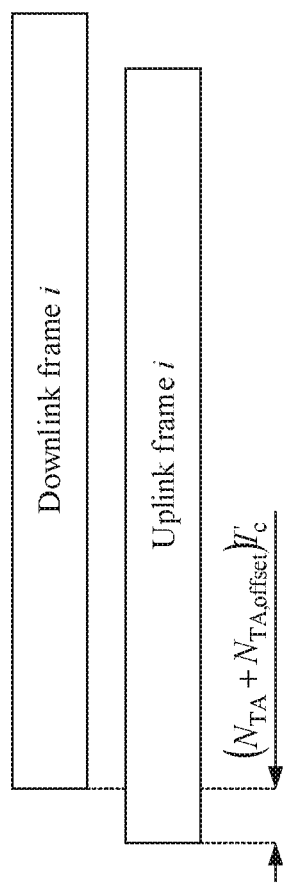
FIG. 5 is a diagram illustrating uplink-downlink timing relation according to one exemplary embodiment.

More details of NR frame structure, channel and/or numerology design are provided in 3GPP TS 38.211 V15.7.0. Notably, FIG. 4.3.1-1 of Section 4.3.1 of 3GPP TS 38.211 V15.7.0, entitled "Uplink-downlink timing relation", is reproduced herein as FIG. 5. One or more parts of 3GPP TS 38.211 V15.7.0 are quoted below:

4 Frame Structure and Physical Resources 4.1 General

Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

4.2 Numerologies

Multiple OFDM numerologies are supported as given by Table 4.2-1 where $\mu$ and the cyclic prefix for a bandwidth part are obtained from the higher-layer parameter subcarrierSpacing and cyclicPrefix, respectively.

TABLE 4.2-1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3 Frame Structure 4.3.1 Frames and Subframes

Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset})T_C$ before the start of the corresponding downlink frame at the UE where $N_{TA,offset}$ is given by [5, TS 38.213].

FIG. 4.3.1-1: Uplink-Downlink Timing Relation.

4.3.2 Slots

For subcarrier spacing configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

A UE not capable of full-duplex communication and not supporting simultaneous transmission and reception as defined by paremeter simultaneousRxTxInterBandENDC, simultaneousRxTxInterBandCA or simultaneousRxTxSUL [10, TS 38.306] among all cells within a group of cells is not expected to transmit in the uplink in one cell within the group of cells earlier than $N_{Rx-Tx}T_c$ after the end of the last received downlink symbol in the same or different cell within the group of cells where $N_{Rx-Tx}$ is given by Table 4.3.2-3.

A UE not capable of full-duplex communication and not supporting simultaneous transmission and reception as defined by parameter simultaneousRxTxInterBandENDC, simultaneousRxTxInterBandCA or simultaneousRxTxSUL [10, TS 38.306] among all cells within a group of cells is not expected to receive in the downlink in one cell within the group of cells earlier than $N_{Tx-Rx}T_c$ after the end of the last transmitted uplink symbol in the same or different cell within the group of cells where $N_{Tx-Rx}$ is given by Table 4.3.2-3.

A UE not capable of full-duplex communication is not expected to transmit in the uplink earlier than $N_{Rx-Tx}T_c$ after the end of the last received downlink symbol in the same cell where $N_{Rx-Tx}$ is given by Table 4.3.2-3.

A UE not capable of full-duplex communication is not expected to receive in the downlink earlier than $N_{Tx-Rx}T_c$ after the end of the last transmitted uplink symbol in the same cell where $N_{Tx-Rx}$ is given by Table 4.3.2-3.

TABLE 4.3.2-1

Number of OFDM symbols per slot, slots per frame,
and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2

Number of OFDM symbols per slot, slots per frame,
and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

TABLE 4.3.2-3

Transition time $N_{Rx-Tx}$ and $N_{Tx-Rx}$

| Transition time | FR1 | FR2 |
|---|---|---|
| $N_{Tx-Rx}$ | 25600 | 13792 |
| $N_{Rx-Tx}$ | 25600 | 13792 |

4.4 Physical Resources
4.4.2 Resource Grid

For each numerology and carrier, a resource grid of $N_{grid,x}^{size,\mu} N_{sc}^{RB}$ subcarriers and $N_{symb}^{subframe,\mu}$ OFDM symbols is defined, starting at common resource block $N_{grid}^{start,\mu}$ indicated by higher-layer signalling. There is one set of resource grids per transmission direction (uplink or downlink) with the subscript x set to DL and UL for downlink and uplink, respectively. When there is no risk for confusion, the subscript x may be dropped. There is one resource grid for a given antenna port p, subcarrier spacing configuration $\mu$, and transmission direction (downlink or uplink).

The carrier bandwidth $N_{grid}^{size,\mu}$ for subcarrier spacing configuration $\mu$ is given by the higher-layer parameter carrierBandwidth in the SCS-SpecificCarrier IE. The starting position $N_{grid}^{start,\mu}$ for subcarrier spacing configuration $\mu$ is given by the higher-layer parameter offsetToCarrier in the SCS-SpecificCarrier IE.

The frequency location of a subcarrier refers to the center frequency of that subcarrier.

For the downlink, the higher-layer parameter txDirectCurrentLocation in the SCS-SpecificCarrier IE indicates the location of the transmitter DC subcarrier in the downlink for each of the numerologies configured in the downlink Values in the range 0-3299 represent the number of the DC subcarrier and the value 3300 indicates that the DC subcarrier is located outside the resource grid.

For the uplink, the higher-layer parameter txDirectCurrentLocation in the UplinkTxDirectCurrentBWP IE indicates the location of the transmitter DC subcarrier in the uplink for each of the configured bandwidth parts, including whether the DC subcarrier location is offset by 7.5 kHz relative to the center of the indicated subcarrier or not. Values in the range 0-299 represent the number of the DC subcarrier, the value 3300 indicates that the DC subcarrier is located outside the resource grid, and the value 3301 indicates that the position of the DC subcarrier in the uplink is undetermined.

4.4.3 Resource Elements

Each element in the resource grid for antenna port p and subcarrier spacing configuration $\mu$ is called a resource element and is uniquely identified by $(k, l)_{p,\mu}$ where k is the index in the frequency domain and l refers to the symbol position in the time domain relative to some reference point. Resource element $(k,l)_{p,\mu}$ corresponds to a physical resource and the complex value $a_{k,l}^{(p,\mu)}$. When there is no risk for confusion, or no particular antenna port or subcarrier spacing is specified, the indices p and $\mu$ may be dropped, resulting in $a_{k,l}^{(p)}$ or $a_{k,l}$.

4.4.4 Resource Blocks
4.4.4.3 Common Resource Blocks

Common resource blocks are numbered from 0 and upwards in the frequency domain for subcarrier spacing configuration $\mu$. The center of subcarrier 0 of common resource block 0 for subcarrier spacing configuration $\mu$ coincides with 'point A'.

The relation between the common resource block number $n_{CRB}^\mu$ in the frequency domain and resource elements (k,l) for subcarrier spacing configuration $\mu$ is given by $$n_{CRB}^\mu = \left\lfloor \frac{k}{N_{sc}^{RB}} \right\rfloor$$

where k is defined relative to point A such that k=0 corresponds to the subcarrier centered around point A.

4.4.4.4 Physical Resource Blocks

Physical resource blocks for subcarrier configuration $\mu$ are defined within a bandwidth part and numbered from 0 to $N_{BWP,i}^{size,\mu}-1$ where i is the number of the bandwidth part. The relation between the physical resource block $n_{PRB}^\mu$ in bandwidth part i and the common resource block $n_{CRB}^\mu$ is given by $$n_{CRB}^\mu = n_{PRB}^\mu + N_{BWP,i}^{start,\mu}$$

where $N_{BWP,i}^{start,\mu}$ is the common resource block where bandwidth part starts relative to common resource block 0. When there is no risk for confusion the index $\mu$ may be dropped.

4.4.4.5 Virtual Resource Blocks

Virtual resource blocks are defined within a bandwidth part and numbered from 0 to $N_{BWP,i}^{size}-1$ where i is the number of the bandwidth part.

4.4.5 Bandwidth Part

A bandwidth part is a subset of contiguous common resource blocks defined in subclause 4.4.4.3 for a given numerology $\mu_i$ in bandwidth part i on a given carrier. The starting position $N_{BWP,i}^{start,\mu}$ and the number of resource blocks $N_{BWP,i}^{size,\mu}$ in a bandwidth part shall fulfil $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index μ may be dropped from $N_{BWP,i}^{start,\mu}$, $N_{BWP,i}^{size,\mu}$, $N_{grid,x}^{start,\mu}$, and $N_{grid,x}^{size,\mu}$.

A bandwidth part has a frequency location (e.g., at least one of a starting position in frequency domain, a starting resource block, etc.) and a bandwidth. When a bandwidth part (of a serving cell, for example) is active, the UE performs transmission (if the bandwidth part is an uplink bandwidth part, for example) and/or reception (if the bandwidth part is a downlink bandwidth part, for example) within frequency resources of the bandwidth part (e.g., the frequency resources of the bandwidth part may be determined based on the frequency location and/or the bandwidth of the bandwidth part). In some examples, a bandwidth of a bandwidth part is up to 275 PRBs based on subcarrier spacing of the bandwidth part. A bandwidth part of a UE may be adapted and/or switched (e.g., an active bandwidth part of a UE may be switched from a first bandwidth part to a second bandwidth part). For example, a UE may be configured with multiple bandwidth parts. In some examples a bandwidth part (e.g., one bandwidth part) of the multiple bandwidth parts may be activated and/or be active at a time (e.g., more than one bandwidth part of the multiple bandwidth parts may not be activated and/or active at a time). When a first bandwidth part is active, the UE may activate a second bandwidth part. (e.g., and deactivate the second bandwidth part) to achieve bandwidth part adaptation, bandwidth part switch and/or bandwidth part change. There are various ways to change active bandwidth part (e.g., an active bandwidth part may be changed via at least one of Radio Resource Control (RRC), downlink control information (DCI), a timer, a random access procedure, etc.). More details of bandwidth part may be found in 3GPP TS 38.213 V16.2.0 and 3GPP TS 38.331 v16.0.0, parts of which are quoted below:

One or more parts of 3GPP TS 38.213 V16.2.0 are quoted below:

12 Bandwidth Part Operation

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink or by parameter initialDownlinkBWP with a set of parameters configured by BWP-DownlinkCommon and BWP-DownlinkDedicated, and a set of at most four BWPs for transmissions by the UE (UL BWP set) in an UL bandwidth by parameter BWP-Uplink or by parameter initialUplinkBWP with a set of parameters configured by BWP-UplinkCommon and BWP-UplinkDedicated.

If a UE is not provided initialDownlinkBWP, an initial DL BWP is defined by a location and number of contiguous PRBs, starting from a PRB with the lowest index and ending at a PRB with the highest index among PRBs of a CORESET for Type0-PDCCH CSS set, and a SCS and a cyclic prefix for PDCCH reception in the CORESET for Type0-PDCCH CSS set; otherwise, the initial DL BWP is provided by initialDownlinkBWP. For operation on the primary cell or on a secondary cell, a UE is provided an initial UL BWP by initialUplinkBWP. If the UE is configured with a supplementary UL carrier, the UE can be provided an initial UL BWP on the supplementary UL carrier by initialUplinkBWP.

If a UE has dedicated BWP configuration, the UE can be provided by firstActiveDownlinkBWP-Id a first active DL BWP for receptions and by firstActiveUplinkBWP-Id a first active UL BWP for transmissions on a carrier of the primary cell.

For each DL BWP or UL BWP in a set of DL BWPs or UL BWPs, respectively, the UE is provided the following parameters for the serving cell as defined in [4, TS 38.211] or [6, TS 38.214]:

a SCS by subcarrierSpacing a cyclic prefix by cyclicPrefix a common RB $N_{BWP}^{start}=O_{carrier}+RB_{start}$ and a number of contiguous RBs $N_{BWP}^{size}=L_{RB}$ provided by locationAndBandwidth that indicates an offset $RB_{start}$ and a length $L_{RB}$ as RIV according to [6, TS 38.214], setting $N_{BWP}^{size}=275$, and a value $O_{carrier}$ provided by offsetToCarrier for the subcarrierSpacing an index in the set of DL BWPs or UL BWPs by respective BWP-Id a set of BWP-common and a set of BWP-dedicated parameters by BWP-DownlinkCommon and BWP-DownlinkDedicated for the DL BWP, or BWP-UplinkCommon and BWP-UplinkDedicated for the UL BWP [12, TS 38.331]

For unpaired spectrum operation, a DL BWP from the set of configured DL BWPs with index provided by BWP-Id is linked with an UL BWP from the set of configured UL BWPs with index provided by BWP-Id when the DL BWP index and the UL BWP index are same. For unpaired spectrum operation, a UE does not expect to receive a configuration where the center frequency for a DL BWP is different than the center frequency for an UL BWP when the BWP-Id of the DL BWP is same as the BWP-Id of the UL BWP.

For each DL BWP in a set of DL BWPs of the PCell, or of the PUCCH-SCell, a UE can be configured CORESETs for every type of CSS sets and for USS as described in Clause 10.1. The UE does not expect to be configured without a CSS set on the PCell, or on the PUCCH-SCell, of the MCG in the active DL BWP.

If a UE is provided controlResourceSetZero and searchSpaceZero in PDCCH-ConfigSIB1 or PDCCH-ConfigCommon, the UE determines a CORESET for a search space set from controlResourcesetZero as described in Clause 13 and for Tables 13-1 through 13-10, and determines corresponding PDCCH monitoring occasions as described in Clause 13 and for Tables 13-11 through 13-15. If the active DL BWP is not the initial DL BWP, the UE determines PDCCH monitoring occasions for the search space set only if the CORESET bandwidth is within the active DL BWP and the active DL BWP has same SCS configuration and same cyclic prefix as the initial DL BWP.

For each UL BWP in a set of UL BWPs of the PCell or of the PUCCH-SCell, the UE is configured resource sets for PUCCH transmissions as described in Clause 9.2.1.

A UE receives PDCCH and PDSCH in a DL BWP according to a configured SCS and CP length for the DL BWP. A UE transmits PUCCH and PUSCH in an UL BWP according to a configured SCS and CP length for the UL BWP.

One or more parts of 3GPP TS 38.331 v16.0.0 are quoted below:

BWP

The IE BWP is used to configure generic parameters of a bandwidth part as defined in TS 38.211 [16], clause 4.5, and TS 38.213 [13], clause 12.

For each serving cell the network configures at least an initial downlink bandwidth part and one (if the serving cell is configured with an uplink) or two (if using supplementary uplink (SUL)) initial uplink bandwidth parts. Furthermore, the network may configure additional uplink and downlink bandwidth parts for a serving cell.

The uplink and downlink bandwidth part configurations are divided into common and dedicated parameters.

---

BWP information element

```
-- ASN1START
-- TAG-BWP-START
BWP ::=                    SEQUENCE {
  locationAndBandwidth       INTEGER (0..37949),
  subcarrierSpacing          SubcarrierSpacing,
  cyclicPrefix               ENUMERATED { extended }
OPTIONAL   -- Need R
}
-- TAG-BWP-STOP
-- ASN1STOP
```

BWP field descriptions cyclicPrefix

Indicates whether to use the extended cyclic prefix for this bandwidth part. If not set, the UE uses the normal cyclic prefix. Normal CP is supported for all subcarrier spacings and slot formats. Extended CP is supported only for 60 kHz subcarrier spacing. (see TS 38.211 [16], clause 4.2)

locationAndBandwidth

Frequency domain location and bandwidth of this bandwidth part. The value of the field shall be interpreted as resource indicator value (RIV) as defined TS 38.214 [19] with assumptions as described in TS 38.213 [13], clause 12, i.e. setting $N_{BWT}^{size} = 275$. The first PRB is a PRB determined by subcarrierSpacing of this BWP and offset ToCarrier (configured in SCS-SpecificCarrier contained within FrequencyInfoDL/FrequencyInfoUL/FrequencyInfoUL-SIB/FrequencyInfoDL-SIB within ServingCellConfigCommon/ServingCellConfigCommonSIB) corresponding to this subcarrier spacing. In case of TDD, a BWP-pair (UL BWP and DL BWP with the same bwp-Id) must have the same center frequency (see TS 38.213 [13], clause 12)

subcarrierSpacing

Subcarrier spacing to be used in this BWP for all channels and reference signals unless explicitly configured elsewhere. Corresponds to subcarrier spacing according to TS 38.211 [16], table 4.2-1. The value kHz15 corresponds to $\mu = 0$, value kHz30 corresponds to $\mu = 1$, and so on. Only the values 15 kHz, 30 kHz, or 60 kHz (FR1), and 60 kHz or 120 kHz (FR2) are applicable. For the initial DL BWP this field has the same value as the field subCarrierSpacingCommon in MIB of the same serving cell.

<...>

SCS-SpecificCarrier

The IE SCS-SpecificCarrier provides parameters determining the location and width of the actual carrier or the carrier bandwidth. It is defined specifically for a numerology (subcarrier spacing (SCS)) and in relation (frequency offset) to Point A.

---

SCS-SpecificCarrier information element

```
-- ASN1START
-- TAG-SCS-SPECIFICCARRIER-START
SCS-SpecificCarrier ::=    SEQUENCE {
  offsetToCarrier            INTEGER (0 .. 2199),
  subcarrierSpacing          SubcarrierSpacing,
  carrierBandwidth           INTEGER
  (1..maxNrofPhysicalResourceBlocks),
  ...,
  [[
  txDirectCurrentLocation    INTEGER (0..4095)
OPTIONAL   -- Need S
  ]]
}
-- TAG-SCS-SPECIFICCARRIER-STOP
-- ASN1STOP
```

SCS-SpecificCarrier field descriptions carrierBandwidth

Width of this carrier in number of PRBs (using the subcarrierSpacing defined for this carrier) (see TS 38.211 [16], clause 4.4.2).

offsetToCarrier

Offset in frequency domain between Point A (lowest subcarrier of common RB 0) and the lowest usable subcarrier on this carrier in number of PRBs (using the subcarrierSpacing defined for this carrier). The maximum value corresponds to 275*8-1. See TS 38.211 [16], clause 4.4.2.

txDirectCurrentLocation

Indicates the downlink Tx Direct Current location for the carrier. A value in the range 0 . . . 3299 indicates the subcarrier index within the carrier. The values in the value range 3301 . . . 4095 are reserved and ignored by the UE. If this field is absent for downlink within ServingCellConfigCommon and ServingCellConfigCommonSIB, the UE assumes the default value of 3300 (i.e. "Outside the carrier"). (see TS 38.211 [16], clause 4.4.2). Network does not configure this field via ServingCellConfig or for uplink carriers.

subcarrierSpacing

Subcarrier spacing of this carrier. It is used to convert the offsetToCarrier into an actual frequency. Only the values 15 kHz, 30 kHz or 60 kHz (FR1), and 60 kHz or 120 kHz (FR2) are applicable.

---

Resource allocation in frequency domain for a data channel (e.g., Physical Downlink Shared Channel (PDSCH) and/or Physical Uplink Shared Channel (PUSCH)) may be performed via a field (e.g., an information field) carried on downlink control information (DCI). DCI may be carried on a PDCCH scheduling the data channel. A bit map and/or a resource indicator value (RIV) may be used to indicate one or more resources within a bandwidth of a bandwidth part (e.g., bandwidth portion). A bit map may comprise a plurality of bits and/or indicate one or more resources allocated for a UE. For example, each bit of the bit map may be associated with a resources unit (e.g., one resource unit), such as a physical resources block (PRB) (e.g., one PRB) and/or a resource block group (e.g., one RBG). In some examples, a bit of the bit map having a bit value of "1" may indicate that an associated resource unit (e.g., a PRB and/or RBG associated with the bit) is allocated for the UE. For example, the bit map comprising "1001 . . . " may indicate that a first resource unit (e.g., initial resource unit) is allocated to the UE, a second resource unit following (e.g., directly following) the first resource unit is not allocated to the UE, a third resource unit following (e.g., directly following) the second resource unit is not allocated to the UE, a fourth resource unit following (e.g., directly following) the third resource unit is allocated to the UE, etc. A RIV may indicate a set of contiguous resources allocated for the UE. A UE may derive, from the RIV, a starting position and a length (in units of resource units, for example) of allocated resources (e.g., resources allocated to the UE). For example, if the starting position is 3 and the length is 5, the resources allocated to the UE are resource units 3~7.

More details of resource allocation are provided in 3GPP TS 38.214 V16.2.0, one or more parts of which are quoted below:

5.1.2.2 Resource Allocation in Frequency Domain

Two downlink resource allocation schemes, type 0 and type 1, are supported. The UE shall assume that when the scheduling grant is received with DCI format 1_0, then downlink resource allocation type 1 is used.

5.1.2.2.1 Downlink Resource Allocation Type 0

In downlink resource allocation of type 0, the resource block assignment information includes a bitmap indicating the Resource Block Groups (RBGs) that are allocated to the scheduled UE where a RBG is a set of consecutive virtual resource blocks defined by higher layer parameter rbg-Size configured by PDSCH-Config and the size of the bandwidth part as defined in Table 5.1.2.2.1-1.

TABLE 5.1.2.2.1-1

| | Nominal RBG size P | |
| --- | --- | --- |
| • Bandwidth Part Size | • Configuration 1 | • Configuration 2 |
| 1-36 | 2 | 4 |
| 37-72 | 4 | 8 |
| 73-144 | 8 | 16 |
| 145-275 | 16 | 16 |

The total number of RBGs ($N_{RBG}$) for a downlink bandwidth part i of size $N_{BWP}^{size}$ RPRBs is given by $N_{RBG}=\lceil(N_{BWP,i}^{size}+(N_{BWP,i}^{start}\bmod P))/P\rceil$, where the size of the first RBG is $RBG_0^{size}=P-N_{BWP,i}^{start}\bmod P$, the size of last RBG is $RBG_{last}^{size}=(N_{BWP,i}^{start}+N_{BWP,i}^{size})\bmod P$ if $(N_{BWP,i}^{start}+N_{BWP,i}^{size})\bmod P>0$ and P otherwise, the size of all other RBGs is P.

The bitmap is of size $N_{RBG}$ bits with one bitmap bit per RBG such that each RBG is addressable. The RBGs shall be indexed in the order of increasing frequency and starting at the lowest frequency of the bandwidth part. The order of RBG bitmap is such that RBG 0 to $RBG_{N_{RBG}-1}$ are mapped from MSB to LSB. The RBG is allocated to the UE if the corresponding bit value in the bitmap is 1, the RBG is not allocated to the UE otherwise.

5.1.2.2.2 Downlink Resource Allocation Type 1

In downlink resource allocation of type 1, the resource block assignment information indicates to a scheduled UE a set of contiguously allocated non-interleaved or interleaved virtual resource blocks within the active bandwidth part of size $N_{BWP}^{size}$ PRBs except for the case when DCI format 1_0 is decoded in any common search space in which case the size of CORESET 0 shall be used if CORESET 0 is configured for the cell and the size of initial DL bandwidth part shall be used if CORESET 0 is not configured for the cell.

A downlink type 1 resource allocation field consists of a resource indication value (RIV) corresponding to a starting virtual resource block ($RB_{start}$) and a length in terms of contiguously allocated resource blocks $L_{RBs}$. The resource indication value is defined by if $(L_{RBs}-1) \leq \lfloor N_{BWP}^{size}/2 \rfloor$ then $$RIV=N_{BWP}^{size}(L_{RBs}-1)+RB_{start}$$

else $$RIV=N_{BWP}^{size}(N_{BWP}^{size}-L_{RBs}+1)+(N_{BWP}^{size}-1-RB_{start})$$

where $L_{RBs} \geq 1$ and shall not exceed $N_{BWP}^{size}-RB_{start}$.

When the DCI size for DCI format 1_0 in USS is derived from the size of DCI format 1_0 in CSS but applied to an active BWP with size of $N_{BWP}^{active}$, a downlink type 1 resource block assignment field consists of a resource indication value (RIV) corresponding to a starting resource block $RB_{start}=0, K, 2 \cdot K \ldots, (N_{BWP}^{initial}-1) \cdot K$ and a length in terms of virtually contiguously allocated resource blocks $L_{RBs}=K, 2, K, \ldots, N_{BWP}^{initial} \cdot K$, where $N_{BWP}^{initial}$ is given by the size of CORESET 0 if CORESET 0 is configured for the cell;

the size of initial DL bandwidth part if CORESET 0 is not configured for the cell.

The resource indication value is defined by:

if $(L'_{RBs}-1) \leq \lfloor N_{BWP}^{initial}/2 \rfloor$ then $$RIV=N_{BWP}^{initial}(L'_{RBs}-1)+RB'_{start}$$

else $$RIV=N_{BWP}^{initial}(N_{BWP}^{initial}-L'_{RBs}+1)+(N_{BWP}^{initial}-1-RB'_{start})$$

where $L'_{RBs}=L_{RBs}/K$, $RB'_{start}=RB_{start}/K$ and where $L'_{RBs}$ shall not exceed $N_{BWP}^{initial}-RB'_{start}$.

If $N_{BWP}^{active}>N_{BWP}^{initial}$, K is the maximum value from set $\{1, 2, 4, 8\}$ which satisfies $K \leq \lfloor N_{BWP}^{active}/N_{BWP}^{initial}\rfloor$; otherwise K=1.

When the scheduling grant is received with DCI format 1_2, a downlink type 1 resource allocation field consists of a resource indication value (RIV) corresponding to a starting resource block group $RBG_{start}=0, 1, \ldots, N_{RBG}-1$ and a length in terms of virtually contiguously allocated resource block groups $L_{RBGs}=1, \ldots, N_{RBG}$, where the resource block groups are defined as in 5.1.2.2.1 with P defined by ResourceAllocationType1-granularity-ForDCIFormat1_2 if the UE is configured with higher layer parameter ResourceAllocationType1-granularity-ForDCIFormat1_2, and P=1 otherwise. The resource indication value is defined by if $(L_{RBG}-1) \leq \lfloor N_{RBG}/2 \rfloor$ then $$RIV=N_{RBG}(L_{RBGs}-1)+RBG_{start}$$

else $$RIV=N_{RBG}(N_{RBG}-L_{RBGs}+1)+(N_{RBG}-1-RBG_{start})$$

where $L_{RBGs} \geq 1$ and shall not exceed $N_{RBG}-RBG_{start}$.

One or more resource blocks assigned by a DCI via frequency domain resource allocation may be one or more virtual resource blocks (VRBs). One or more virtual resource blocks may be mapped to one or more physical resource blocks (PRBs). One or more transmissions for a data channel in the frequency domain may be performed based on the one or more PRBs. Two different types of mapping may be supported (such as to increase diversity of allocated frequency resources). One type of mapping is non-interleaved mapping (e.g., localized mapping). For non-interleaved mapping (e.g., localized mapping), a VRB is mapped to a PRB with a same index (e.g., the VRB and the PRB to which the VRB is mapped have the same index). One or more frequency resources occupied by a data channel are determined based on (e.g., only based on) a resource allocation field in DCI (e.g., a field, in the DCI, indicative of one or more allocated resources). Accordingly, under non-interleaved mapping (e.g., localized mapping), if allocated VRBs are contiguous in the frequency domain, the allocated VRBs would be mapped to contiguous PRBs (since the same index is used, for example). A second type of mapping is interleaved mapping (e.g., distributed mapping). For interleaved mapping (e.g., distributed mapping), a VRB with a first index may be mapped to a PRB with a second index different than the first index. There may be one or more mapping rules (e.g., one or more specified mapping rules) for interleaved mapping (e.g., distributed mapping). VRB indices may be interleaved and/or shuffled into (diverse, for example) PRB indices based on the interleaved mapping (e.g., distributed mapping). If allocated VRBs are contiguous in frequency domain, the allocated VRBs may be mapped to non-contiguous PRBs under interleaved mapping (e.g., distributed mapping), since, for example, the indices are interleaved and/or shuffled. Frequency hopping may be applied for PUSCH to achieve interleaved mapping (e.g., distributed mapping).

More details for mapping may be found in 3GPP TS 38.211 V15.7.0, one or more parts of which are quoted below:

7.3.1.5 Mapping to Virtual Resource Blocks

The UE shall, for each of the antenna ports used for transmission of the physical channel, assume the block of complex-valued symbols $y^{(p)}(0), \ldots, y^{(p)}(M_{symb}^{ap}-1)$ conform to the downlink power allocation specified in [6, TS 38.214] and are mapped in sequence starting with $y^{(p)}(0)$ to resource elements $(k',l)_{p,\mu}$ in the virtual resource blocks assigned for transmission which meet all of the following criteria:

they are in the virtual resource blocks assigned for transmission;

the corresponding physical resource blocks are declared as available for PDSCH according to clause 5.1.4 of [6, TS 38.214];

the corresponding resource elements in the corresponding physical resource blocks are not used for transmission of the associated DM-RS or DM-RS intended for other co-scheduled UEs as described in clause 7.4.1.1.2;

not used for non-zero-power CSI-RS according to clause 7.4.1.5 if the corresponding physical resource blocks are for PDSCH scheduled by PDCCH with CRC scrambled by C-RNTI, MCS-C-RNTI, CS-RNTI, or PDSCH with SPS, except if the non-zero-power CSI-RS is a CSI-RS configured by the higher-layer parameter CSI-RS-Resource-Mobility in the MeasObjectNR IE or except if the non-zero-power CSI-RS is an aperiodic non-zero-power CSI-RS resource;

not used for PT-RS according to clause 7.4.1.2;

not declared as 'not available for PDSCH according to clause 5.1.4 of [6, TS 38.214].

The mapping to resource elements $(k',l)_{p,\mu}$ allocated for PDSCH according to [6, TS 38.214] and not reserved for other purposes shall be in increasing order of first the index k' over the assigned virtual resource blocks, where k'=0 is the first subcarrier in the lowest-numbered virtual resource block assigned for transmission, and then the index l.

7.3.1.6 Mapping from Virtual to Physical Resource Blocks

The UE shall assume the virtual resource blocks are mapped to physical resource blocks according to the indicated mapping scheme, non-interleaved or interleaved mapping. If no mapping scheme is indicated, the UE shall assume non-interleaved mapping.

For non-interleaved VRB-to-PRB mapping, virtual resource block n is mapped to physical resource block n, except for PDSCH transmissions scheduled with DCI format 1_0 in a common search space in which case virtual resource block n is mapped to physical resource block n+$N_{start}^{CORESET}$ where $N_{start}^{CORESET}$ is the lowest-numbered physical resource block in the control resource set where the corresponding DCI was received.

For interleaved VRB-to-PRB mapping, the mapping process is defined by:

Resource block bundles are defined as for PDSCH transmissions scheduled with DCI format 1_0 with the CRC scrambled by SI-RNTI in Type0-PDCCH common search space in CORESET 0, the set of $N_{BWP,init}^{size}$ resource blocks in CORESET 0 are divided into $N_{bundle}=\lceil N_{BWP,init}^{size}/L \rceil$ resource-block bundles in increasing order of the resource-block number and bundle number where L=2 is the bundle size and $N_{BWP,init}^{size}$ is the size of CORESET 0.

resource block bundle $N_{bundle}-1$ consists of $N_{BWP,init}^{size}$ mod L resource blocks if $N_{BWP,init}^{size}$ mod L>0 and L resource blocks otherwise, all other resource block bundles consists of L resource blocks.

for PDSCH transmissions scheduled with DCI format 1_0 in any common search space in bandwidth part i with starting position $N_{BWP,i}^{start}$, other than Type0-PDCCH common search space in CORESET 0, the set of $N_{BWP,init}^{size}$ virtual resource blocks $\{0, 1, \ldots, N_{BWP,init}^{size}-1\}$, where $N_{BWP,init}^{size}$ is the size of CORESET 0 if CORESET 0 is configured for the cell and the size of initial downlink bandwidth part if CORESET 0 is not configured for the cell, are divided into $N_{bundle}$ virtual resource-block bundles in increasing order of the virtual resource-block number and virtual bundle number and the set of $N_{BWP,init}^{size}$ physical resource blocks $\{N_{start}^{CORESET}, N_{start}^{CORESET}+1, \ldots, N_{start}^{CORESET}+N_{BWP,init}^{size}-1\}$ are divided into $N_{bundle}$ physical resource-block bundles in increasing order of the physical resource-block number and physical bundle number, where $N_{bundle}=\lceil (N_{BWP,init}^{size}+(N_{BWP,i}^{start}+N_{start}^{CORESET}) \bmod L)/L \rceil$, L=2 is the bundle size, and $N_{start}^{CORESET}$ is the lowest-numbered physical resource block in the control resource set where the corresponding DCI was received.

resource block bundle 0 consists of L−(($N_{BWP,i}^{start}$+$N_{start}^{CORESET}$)mod L) resource blocks, resource block bundle $N_{bundle}-1$ consists of ($N_{BWP,init}^{size}$+$N_{BWP,i}^{start}$+$N_{start}^{CORESET}$) mod L resource blocks if ($N_{BWP,init}^{size}$+$N_{BWP,i}^{start}$+$N_{start}^{CORESET}$) mod L>0 and L resource blocks otherwise, all other resource block bundles consists of L resource blocks.

for all other PDSCH transmissions, the set of $N_{BWP,i}^{size}$ resource blocks in bandwidth part i with starting position $N_{BWP,i}^{start}$ are divided into $N_{bundle}=\lceil (N_{BWP,i}^{size}+(N_{BWP,i}^{start} \bmod L_i))/L_i \rceil$ resource-block bundles in increasing order of the resource-block number and bundle number where $L_i$ is the bundle size for bandwidth part i provided by the higher-layer parameter vrb-ToPRB-Interleaver and resource block bundle 0 consists of $L_i-(N_{BWP,i}^{start}$ mod $L_i)$ resource blocks, resource block bundle $N_{bundle}-1$ consists of ($N_{BWP,i}^{start}$+$N_{BWP,i}^{size}$)mod $L_i$ resource blocks if ($N_{BWP,i}^{start}$+$N_{BWP,i}^{size}$)mod $L_i$>0 and $L_i$ resource blocks otherwise, all other resource block bundles consists of $L_i$ resource blocks.

Virtual resource blocks in the interval $j \in \{0,1, \ldots, N_{bundle}-1\}$ are mapped to physical resource blocks according to virtual resource block bundle $N_{bundle}-1$ is mapped to physical resource block bundle $N_{bundle}-1$ virtual resource block bundle $j \in \{0,1, \ldots, N_{bundle}-2\}$ is mapped to physical resource block bundle $f(j)$ where $f(j)=rC+c$ $j=cR+r$ $r=0,1,\ldots,R-1$ $c=0,1,\ldots,C-1$ $R=2$ $C=\lfloor N_{bundle}/R \rfloor$ One or more parts of 3GPP TS 38.214 V16.2.0 are quoted below:

6.3 UE PUSCH Frequency Hopping Procedure 6.3.1 Frequency Hopping for PUSCH Repetition Type A For PUSCH repetition Type A (as determined according to procedures defined in Clause 6.1.2.1 for scheduled PUSCH, or Clause 6.1.2.3 for configured PUSCH), a UE is configured for frequency hopping by the higher layer parameter frequencyHopping-ForDCIFormat0_2 in pusch-Config for PUSCH transmission scheduled by DCI format 0_2, and by frequencyHopping provided in pusch-Config for PUSCH transmission scheduled by a DCI format other than 0_2, and by frequencyHopping provided in configuredGrantConfig for configured PUSCH transmission. One of two frequency hopping modes can be configured:

Intra-slot frequency hopping, applicable to single slot and multi-slot PUSCH transmission.

Inter-slot frequency hopping, applicable to multi-slot PUSCH transmission.

In case of resource allocation type 2, the UE transmits PUSCH without frequency hopping.

In case of resource allocation type 1, whether or not transform precoding is enabled for PUSCH transmission, the UE may perform PUSCH frequency hopping, if the frequency hopping field in a corresponding detected DCI format or in a random access response UL grant is set to 1, or if for a Type 1 PUSCH transmission with a configured grant the higher layer parameter frequencyHoppingOffset is provided, otherwise no PUSCH frequency hopping is performed. When frequency hopping is enabled for PUSCH, the RE mapping is defined in clause 6.3.1.6 of [4, TS 38.211].

For a PUSCH scheduled by RAR UL grant, fallbackRAR UL grant, or by DCI format 0_0 with CRC scrambled by TC-RNTI, frequency offsets are obtained as described in clause 8.3 of [6, TS 38.213]. For a PUSCH scheduled by DCI format 0_0/0_1 or a PUSCH based on a Type2 configured UL grant activated by DCI format 0_0/0_1 and for resource allocation type 1, frequency offsets are configured by higher layer parameter frequencyHoppingOffsetLists in pusch-Config. For a PUSCH scheduled by DCI format 0_2 or a PUSCH based on a Type2 configured UL grant activated by DCI format 0_2 and for resource allocation type 1, frequency offsets are configured by higher layer parameter frequencyHoppingOffsetLists-ForDCIFormat0_2 in pusch-Config.

When the size of the active BWP is less than 50 PRBs, one of two higher layer configured offsets is indicated in the UL grant.

When the size of the active BWP is equal to or greater than 50 PRBs, one of four higher layer configured offsets is indicated in the UL grant.

For PUSCH based on a Type1 configured UL grant the frequency offset is provided by the higher layer parameter frequencyHoppingOffset in rrc-ConfiguredUplinkGrant.

For a MsgA PUSCH the frequency offset is provided by the higher layer parameter as described in [6, TS 38.213.

In case of intra-slot frequency hopping, the starting RB in each hop is given by:

$$RB_{start} = \begin{cases} RB_{start} & i=0 \\ (RB_{start} + RB_{offset}) \bmod N_{BWP}^{size} & i=1 \end{cases},$$

where i=0 and i=1 are the first hop and the second hop respectively, and $RB_{start}$ is the starting RB within the UL BWP, as calculated from the resource block assignment information of resource allocation type 1 (described in Clause 6.1.2.2.2) or as calculated from the resource assignment for MsgA PUSCH (described in [6, TS 38.213]) and $RB_{offset}$ is the frequency offset in RBs between the two frequency hops. The number of symbols in the first hop is given by $\lfloor N_{symb}^{PUSCHs}/2 \rfloor$, the number of symbols in the second hop is given by $N_{symb}^{PUSCHs}-\lfloor N_{symb}^{PUSCHs}/2 \rfloor$, where $N_{symb}^{PUSCH,s}$ is the length of the PUSCH transmission in OFDM symbols in one slot.

In case of inter-slot frequency hopping, the starting RB during slot $n_s^\mu$ is given by:

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases},$$

where $n_s^\mu$ is the current slot number within a radio frame, where a multi-slot PUSCH transmission can take place, $RB_{start}$ is the starting RB within the UL BWP, as calculated from the resource block assignment information of resource allocation type 1 (described in Clause 6.1.2.2.2) and $RB_{offset}$ is the frequency offset in RBs between the two frequency hops.

6.3.2 Frequency Hopping for PUSCH Repetition Type B

For PUSCH repetition Type B (as determined according to procedures defined in Clause 6.1.2.1 for scheduled PUSCH, or Clause 6.1.2.3 for configured PUSCH), a UE is configured for frequency hopping by the higher layer parameter frequencyHopping-ForDCIFormat0_2 in pusch-Config for PUSCH transmission scheduled by DCI format 0_2, by frequencyHopping-ForDCIFormat0_1 provided in pusch-Config for PUSCH transmission scheduled by DCI format 0_1, and by frequencyHopping-PUSCHRepTypeB provided in rrc-ConfiguredUplinkGrant for Type 1 configured PUSCH transmission. The frequency hopping mode for Type 2 configured PUSCH transmission follows the configuration of the activating DCI format. One of two frequency hopping modes can be configured:

Inter-repetition frequency hopping

Inter-slot frequency hopping

In case of resource allocation type 1, whether or not transform precoding is enabled for PUSCH transmission, the UE may perform PUSCH frequency hopping, if the frequency hopping field in a corresponding detected DCI format is set to 1, or if for a Type 1 PUSCH transmission with a configured grant the higher layer parameter frequencyHopping-PUSCHRepTypeB is provided, otherwise no PUSCH frequency hopping is performed. When frequency hopping is enabled for PUSCH, the RE mapping is defined in clause 6.3.1.6 of [4, TS 38.211].

In case of inter-repetition frequency hopping, the starting RB for an actual repetition within the n-th nominal repetition (as defined in Clause 6.1.2.1) is given by:

$$RB_{start}(n) = \begin{cases} RB_{start} & n\bmod 2 = 0 \\ (RB_{start} + RB_{offset})\bmod N_{BWP}^{size} & n\bmod 2 = 1 \end{cases},$$

where $RB_{start}$ is the starting RB within the UL BWP, as calculated from the resource block assignment information of resource allocation type 1 (described in Clause 6.1.2.2) and $RB_{offset}$ is the frequency offset in RBs between the two frequency hops.

In case of inter-slot frequency hopping, the starting RB during slot $n_s^\mu$ follows that of inter-slot frequency hopping for PUSCH Repetition Type A in Clause 6.3.1.

One or more parts of 3GPP TS 38.211 V15.7.0 are quoted below:

9.2.1 PUCCH Resource Sets

. . .

If $\lfloor r_{PUCCH}/8 \rfloor = 0$ and a UE is provided a PUCCH resource by pucch-Resource Common and is not provided useInterlacePUCCHCornrnon-r16 the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{size} - 1 - RB_{BWP}^{offset} - \lfloor r_{PUCCH}/N_{CS} \rfloor$, where $N_{CS}$ is the total number of initial cyclic shift indexes in the set of initial cyclic shift indexes the UE determines the initial cyclic shift index in the set of initial cyclic shift indexes as $r_{PUCCH} \bmod N_{CS}$ If $\lfloor r_{PUCCH}/8 \rfloor = 1$ and a UE is provided a PUCCH resource by pucch-ResourceCommon and is not provided useInterlacePUCCH-PUCCH in BWP-UplinkConunon the UE determines the PRB index of the PUCCH transmission in the first hop as $N_{BWP}^{size} - 1 - RB_{BWP}^{offset} - \lfloor (r_{PUCCH}-8)/N_{CS} \rfloor$ and the PRB index of the PUCCH transmission in the second hop as $RB_{BWP}^{offset} + \lfloor (r_{PUCCH}-8)/N_{CS} \rfloor$ the UE determines the initial cyclic shift index in the set of initial cyclic shift indexes as $(r_{PUCCH}-8) \bmod N_{CS}$ There is a study of operation in frequency band higher than 52.6 GHz. Some changes and/or amendments are under consideration as there are several characteristics different from lower conventional frequency bands (e.g., at least one of wider available bandwidth, larger noise such as larger phase noise, different, such as greater, intercell interference (ICI), etc.). Therefore, it may be expected that a larger subcarrier spacing (e.g., up to 960 kHz) and a bandwidth of a cell may be increased to GHz level, (e.g., 1 or 2 GHz). One or more parts of RP-193259, associated with the study, are quoted below:

This study item will include the following objectives:,
Study of required changes to NR using existing DL/UL NR waveform to support operation between 52.6 GHz and 71 GHz
Study of applicable numerology including subcarrier spacing, channel BW (including maximum BW), and their impact to FR2 physical layer design to support system functionality considering practical RF impairments [RAN1, RAN4].
Identify potential critical problems to physical signal/channels, if any [RAN1].

As discussed above, resource allocation for a UE may be defined by (e.g., confined and/or limited to within) a bandwidth of a bandwidth part (BWP) (e.g., an active bandwidth part) of the UE. Resources that can be allocated to the UE may be based on (e.g., up to) the bandwidth of the bandwidth part (e.g., $N_{BWP}^{size}$ physical resource blocks (PRBs)). To support a larger bandwidth of a cell, a larger subcarrier spacing may be preferred (e.g., a subcarrier spacing of 960 kHz). With existing Fast Fourier Transform (FFT) size and/or Inverse Fast Fourier Transform (IFFT) size (e.g., a FFT size and/or IFFT size of up to 4096), the number of PRBs that the UE is able to receive may be limited (e.g., confined). For example, the number of PRBs may be limited such that a product of the number of PRBs and 12 is smaller than the FFT and/or the IFFT size (i.e., in an example where the FFT and/or the IFFT size is 4096, PRBx12<4096). For example, the number of PRBs (for a bandwidth part and/or cell, for example) may be limited (e.g., confined) to 275. In an example, for 960 kHz subcarrier spacing (e.g., a subcarrier spacing of 960 kHz), 275 PRBs may correspond to about 3.2 GHz bandwidth. Accordingly, when a UE operates with a bandwidth part (e.g., an active bandwidth part) with 960 kHz subcarrier spacing, the UE may be scheduled with resources within a 3.2 GHz bandwidth (e.g., a bandwidth of 3.2 GHz). In this example, both radio frequency (RF) and base band of the UE may operate with 3.2 GHz bandwidth (or, considering guard band, the UE may operate with a bandwidth that is larger (e.g., slightly larger) than 3.2 GHz or smaller (e.g., slightly smaller) than 3.2 GHz). On the other hand, when the UE operates with a bandwidth part (e.g., an active bandwidth part) with 240 kHz subcarrier spacing, the schedulable bandwidth may be reduced to resources within 0.8 GHz bandwidth, even if 3.2 GHz bandwidth is supported by the UE. Accordingly, candidate resources of the UE is reduced if the subcarrier spacing is reduced. The reduction of candidate resources of the UE, as a result of a reduction of the subcarrier spacing, may be more significant if the subcarrier spacing of the bandwidth part is smaller. Scheduling efficiency may be reduced as well due to such constraints of the smaller bandwidth (e.g., the smaller schedulable bandwidth of the UE). A way to avoid this constraint may be to decouple a bandwidth of a bandwidth part and a maximum bandwidth and/or a maximum number of resources that may be scheduled to the UE within the bandwidth part. A first bandwidth may correspond to (and/or may be used as) a bandwidth of a bandwidth part and a second bandwidth may correspond to (and/or may be used as) a maximum bandwidth that may be scheduled to the UE within the bandwidth part. For example, when a bandwidth part with X PRBs is active (for the UE, for example), a maximum number of PRBs that can be allocated to the UE is Y. Alternatively and/or additionally, when a bandwidth part with X PRBs is active (for the UE, for example), a maximum bandwidth that can be allocated to the UE is associated with Y PRBs (e.g., the maximum bandwidth corresponds to a bandwidth of Y PRBs). A bandwidth that can be allocated to a UE may be determined based on (e.g., derived from) a difference between a PRB with a lowest index allocated to the UE (e.g., a PRB with a lowest index among PRBs allocated to the UE) and a PRB with a largest index allocated to the UE (e.g., a PRB with a largest index among PRBs allocated to the UE). A difference between the PRB with the lowest index allocated to the UE and the PRB with the largest index allocated to the UE may be smaller than Y. In some examples, Y is different from X. Y may be smaller than X. In some examples, X (and/or X PRBs of the active bandwidth part) and Y (and/or Y PRBs that can be allocated to the UE) are based on a subcarrier spacing of the bandwidth part. In some examples, X may be larger than 275. In some examples, Y is not larger than 275. However, with interleaved mapping, even if allocated virtual resource blocks (VRBs) (indicated by a resource allocation field, for example) are within a bandwidth of Y PRBs/VRBs (e.g., a set of Y PRBs and/or VRBs that can be allocated to the UE), one or more PRBs used (by the UE, for example) for transmission may be associated with a bandwidth larger than the bandwidth of the Y PRBs/VRBs (e.g., the one or more PRBs for used for transmission may spread across a bandwidth larger than the bandwidth of the Y PRBs/VRBs). Accordingly, the UE may not be able to process the data channel due to insufficient FFT and/or IFFT size.

A first concept of the present disclosure is to disable and/or prohibit interleaved mapping. Interleaved mapping may be disabled and/or prohibited under situations in which one or more issues (e.g., one or more of the aforementioned issues) occur. For example, interleaved mapping may be disabled and/or prohibited (for use in allocating resources for a UE and/or for use in in one or more transmissions by the UE and/or a base station, for example) when (and/or if) a bandwidth of a set of PRBs that can be processed by the UE is smaller than a bandwidth of a bandwidth part. In some examples, the bandwidth part is an active bandwidth part (of the UE, for example). For example, interleaved mapping may be disabled and/or prohibited (for use in allocating resources for a UE and/or for use in in one or more transmissions by the UE and/or the base station, for example) in response to determining that the bandwidth of the set of PRBs that can be processed by the UE is smaller than the bandwidth of the bandwidth part. Alternatively and/or additionally, interleaved mapping may be disabled and/or prohibited (for use in allocating resources for a UE and/or for use in in one or more transmissions by the UE and/or the base station, for example) when (and/or if) the UE receives an indication of a subset of frequency resources within the bandwidth part used for resource allocation (e.g., derived resource allocation). For example, interleaved mapping may be disabled and/or prohibited (for use in allocating resources for a UE and/or for use in in one or more transmissions by the UE and/or the base station, for example) in response to receiving the indication of the subset of frequency resources. Alternatively and/or additionally, interleaved mapping may be disabled and/or prohibited (for use in allocating resources for a UE and/or for use in in one or more transmissions by the UE and/or the base station, for example) when (and/or if) resource allocation for the UE is defined by (e.g., confined and/or limited to within) a bandwidth that is smaller than a bandwidth of a bandwidth part (e.g., an active bandwidth part of the UE). Alternatively and/or additionally, interleaved mapping may be disabled and/or prohibited (for use in allocating resources for a UE and/or for use in in one or more transmissions by the UE and/or the base station, for example) when (and/or if) VRBs allocated to the UE would spread across a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, interleaved mapping may be disabled and/or prohibited (for use in allocating resources for a UE and/or for use in in one or more transmissions by the UE and/or the base station, for example) when (and/or if) VRBs allocated to the UE would spread across a bandwidth larger than a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, interleaved mapping may be disabled and/or prohibited (for use in allocating resources for a UE and/or for use in in one or more transmissions by the UE and/or the base station, for example) when (and/or if) enablement and/or usage of the interleaved mapping would cause resources (e.g., VRBs and/or PRBs) to be allocated to the UE, where the resources would spread across a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, interleaved mapping may be disabled and/or prohibited (for use in allocating resources for a UE and/or for use in in one or more transmissions by the UE and/or the base station, for example) when (and/or if) enablement and/or usage of the interleaved mapping would cause resources (e.g., VRBs and/or PRBs) to be allocated to the UE, where the resources would spread across a bandwidth larger than a bandwidth that defines resource allocation for the UE (e.g., the bandwidth that defines resource allocation for the UE may be a bandwidth to which resource allocation for the UE is limited, such as a bandwidth to which resource allocation for the UE is confined).

A second concept of the present disclosure is to develop and/or use an interleaved mapping (e.g., a new interleaved mapping) and/or a technique for performing interleaved mapping (e.g., a new technique for performing interleaved mapping), where by using the interleaved mapping and/or the technique for performing interleaved mapping, the PRBs for transmission are within a bandwidth that defines resource allocation (e.g., a bandwidth to which resource allocation is limited, such as a bandwidth to which resource allocation is confined). The technique may comprise performing a mapping (e.g., interleaved mapping) across a subset of resources within a bandwidth part. In some examples, the technique does not comprise performing a mapping across a whole bandwidth part (e.g., a whole active bandwidth part of the UE). The subset of resources may be a window. The window may have a size of a bandwidth that defines resource allocation (e.g., a bandwidth to which resource allocation is limited, such as a bandwidth to which resource allocation is confined). The subset of resources may be indicated by a base station (e.g., the base station may transmit an indication, of the subset of resources, to the UE). The subset of resources may be determined based on (e.g., derived from) a DCI (e.g., a DCI transmitted by the base station to the UE). The subset of resources may be determined (e.g., derived) based on one or more resources allocated to a UE.

Examples for mapping (e.g., the new interleaved mapping) and/or techniques for performing mapping (e.g., interleaved mapping) are provided below.

In a first example for mapping (e.g., interleaved VRB-to-PRB mapping), resource block bundles may be defined as: for one or more Physical Downlink Shared Channel (PDSCH) transmissions (e.g., the one or more PDSCH transmissions may correspond to PDSCH transmissions, such as all PDSCH transmissions, other than PDSCH transmissions scheduled with DCI format 1_0 with CRC scrambled by System Information Radio Network Temporary Identifier (SI-RNTI) in Type0-PDCCH common search space in Control Resource Set (CORESET) 0 and/or other than PDSCH transmissions scheduled with DCI format 1_0 in any common search space in bandwidth part i with starting position $N_{BWP,i}^{start}$), a set of Y resource blocks in bandwidth part i with starting position S are divided into $N_{bundle}=\lceil(Y+(S \bmod L_i))/L_i\rceil$ resource-block bundles in increasing order of the resource-block number and bundle number, where $L_i$ is the bundle size for bandwidth part i provided by the higher-layer parameter vrb-ToPRB-Interleaver and where: (i) resource block bundle 0 comprises (e.g., consists of) $L_i$–(S mod $L_i$) resource blocks; (ii) if (S+Y)mod$L_i$>0, resource block bundle $N_{bundle}$–1 comprises (e.g., consists of) (S+Y)mod $L_i$ resource blocks, (iii) if (S+Y)mod$L_i$≤0, resource block bundle $N_{bundle}$–1 comprises (e.g., consists of) $L_i$ resource blocks, and/or (iv) other resource block bundles (e.g., resource block bundles, such as all resource block bundles, other than resource block bundle 0 and resource block bundle $N_{bundle}$–1) each comprise (e.g., consist of) $L_i$ resource blocks.

In the first example for mapping (e.g., interleaved VRB-to-PRB mapping), VRBs in the interval j ∈ {0, 1, . . . , $N_{bundle}$–1} are mapped to PRBs according to: (i) VRB bundle $N_{bundle}$–1 is mapped to PRB bundle $N_{bundle}$–1,(ii) VRB bundle j ∈{0, 1, . . . , $N_{bundle}$–2} is mapped to PRB bundle $f(j)$, where $f(j)=rC+c$ $j=cR+r$ $r=0, 1, \ldots, R-1$ $c=0, 1, \ldots, C-1$ $R=2$ $C=\lfloor N_{bundle}/R \rfloor$, and/or (iii) the UE does not expect (and/or is not expected) to be configured with $L_i$=2 simultaneously and/or concurrently with a Physical Resource Block Group (PRG) size of 4 (such as defined in 3GPP TS 38.214 V16.2.0) (e.g., the UE may not be configured with $L_i$=2 and the PRG size of 4 at the same time).

In the first example for mapping (e.g., interleaved VRB-to-PRB mapping), S may be different from $N_{BWP,i}^{start}$. Y may be different from $N_{BWP,i}^{size}$. S and/or Y may be indicated by a base station (e.g., the base station may transmit an indication of S and/or Y to the UE). S may be a starting position of a set of frequency resources. Y may be a size and/or bandwidth of a set of resources (e.g., the set of frequency resources). The set of resources may be a subset of resources of a bandwidth part (e.g., an active bandwidth part of the UE). S and/or Y may not be provided via (and/or given by) a locationAndBandwidth field (e.g., S and/or Y may not be determined based on a locationAndBandwidth field). In some examples, S is not an index of a lowest PRB and/or a lowest Common Resource Block (CRB) of a bandwidth part (e.g., an active bandwidth part of the UE). In some examples, Y is not a size and/or bandwidth of a bandwidth part (e.g., an active bandwidth part of the UE). A lowest PRB of a bandwidth part may correspond to a PRB with a lowest index among PRBs of the bandwidth part. A lowest CRB of a bandwidth part may correspond to a CRB with a lowest index among CRB s of the bandwidth part. S may be larger than an index of a lowest PRB and/or lowest CRB of a bandwidth part. Y may be smaller than a bandwidth and/or size of a bandwidth part. S and/or $N_{BWP,i}^{start}$ may be used for VRB to PRB mapping under different situations (e.g., in some situations S may be used for VRB to PRB mapping and/or in other situations $N_{BWP,i}^{start}$ may be used for VRB to PRB mapping). Y and/or $N_{BWP,i}^{size}$ may be used for VRB to PRB mapping under different situations (e.g., in some situations Y may be used for VRB to PRB mapping and/or in other situations $N_{BWP,i}^{size}$ may be used for VRB to PRB mapping).

In the first example for mapping (e.g., interleaved VRB-to-PRB mapping), S and/or Y may be used for VRB to PRB mapping (and/or $N_{BWP,i}^{start}$ and/or $N_{BWP,i}^{size}$ may not be used for VRB to PRB mapping) when one or more issues (e.g., one or more of the aforementioned issues) occur. For example, S and/or Y may be used for VRB to PRB mapping (and/or $N_{BWP,i}^{start}$ and/or $N_{BWP,i}^{size}$ may not be used for VRB to PRB mapping) when (and/or if) a bandwidth of a set of PRBs that can be processed by the UE is smaller than a bandwidth of a bandwidth part. In some examples, the bandwidth part is an active bandwidth part (of the UE, for example). For example, S and/or Y may be used for VRB to PRB mapping (and/or $N_{BWP,i}^{start}$ and/or $N_{BWP,i}^{size}$ may not be used for VRB to PRB mapping) in response to determining that the bandwidth of the set of PRBs that can be processed by the UE is smaller than the bandwidth of the bandwidth part. Alternatively and/or additionally, S and/or Y may be used for VRB to PRB mapping (and/or $N_{BWP,i}^{start}$ and/or $N_{BWP,i}^{size}$ may not be used for VRB to PRB mapping) when (and/or if) the UE receives an indication of a subset of frequency resources within the bandwidth part used for resource allocation (e.g., derived resource allocation). For example, S and/or Y may be used for VRB to PRB mapping (and/or $N_{BWP,i}^{start}$ and/or $N_{BWP,i}^{size}$ may not be used for VRB to PRB mapping) in response to receiving the indication of the subset of frequency resources. Alternatively and/or additionally, S and/or Y may be used for VRB to PRB mapping (and/or $N_{BWP,i}^{start}$ and/or $N_{BWP,i}^{size}$ may not be used for VRB to PRB mapping) when (and/or if) resource allocation for the UE is defined by (e.g., confined and/or limited to within) a bandwidth that is smaller than a bandwidth of a bandwidth part (e.g., an active bandwidth part of the UE). Alternatively and/or additionally, S and/or Y may be used for VRB to PRB mapping (and/or $N_{BWP,i}^{start}$ and/or $N_{BWP,i}^{size}$ may not be used for VRB to PRB mapping) when (and/or if) VRBs allocated to the UE would spread across a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, S and/or Y may be used for VRB to PRB mapping (and/or $N_{BWP,i}^{start}$ and/or $N_{BWP,i}^{size}$ may not be used for VRB to PRB mapping) when (and/or if) VRBs allocated to the UE would spread across a bandwidth larger than a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, S and/or Y may be used for VRB to PRB mapping (and/or $N_{BWP,i}^{start}$ and/or $N_{BWP,i}^{size}$ may not be used for VRB to PRB mapping) when (and/or if) enablement and/or usage of the interleaved mapping would cause resources (e.g., VRBs and/or PRBs) to be allocated to the UE, where the resources would spread across a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, S and/or Y may be used for VRB to PRB mapping (and/or $N_{BWP,i}^{start}$ and/or $N_{BWP,i}^{size}$ may not be used for VRB to PRB mapping) when (and/or if) enablement and/or usage of the interleaved mapping would cause resources (e.g., VRBs and/or PRBs) to be allocated to the UE, where the resources would spread across a bandwidth larger than a bandwidth that defines resource allocation for the UE (e.g., the bandwidth that defines resource allocation for the UE may be a bandwidth to which resource allocation for the UE is limited, such as a bandwidth to which resource allocation for the UE is confined).

In the first example for mapping (e.g., interleaved VRB-to-PRB mapping), $N_{BWP,i}^{start}$ and/or $N_{BWP,i}^{size}$ may be used for VRB to PRB mapping (and/or S and/or Y may not be used for VRB to PRB mapping) when one or more issues (e.g., one or more of the aforementioned issues) do not occur. For example, $N_{BWP,i}^{start}$ and/or $N_{BWP,i}^{size}$ may be used for VRB to PRB mapping (and/or S and/or Y may not be used for VRB to PRB mapping) when (and/or if) a bandwidth of a set of PRBs that can be processed by the UE is not smaller than a bandwidth of a bandwidth part. In some examples, the bandwidth part is an active bandwidth part (of the UE, for example). For example, $N_{BWP,i}^{start}$ and/or $N_{BWP,i}^{size}$ may be used for VRB to PRB mapping (and/or S and/or Y may not be used for VRB to PRB mapping) in response to determining that the bandwidth of the set of PRBs that can be processed by the UE is not smaller than the bandwidth of the bandwidth part. Alternatively and/or additionally, $N_{BWP,i}^{start}$ and/or $N_{BWP,i}^{size}$ may be used for VRB to PRB mapping (and/or S and/or Y may not be used for VRB to PRB mapping) when (and/or if) the UE does not receive an indication of a subset of frequency resources within the bandwidth part used for resource allocation (e.g., derived resource allocation). Alternatively and/or additionally, $N_{BWP,i}^{start}$ and/or $N_{BWP,i}^{size}$ may be used for VRB to PRB mapping (and/or S and/or Y may not be used for VRB to PRB mapping) when (and/or if) resource allocation for the UE is not defined by (e.g., not confined and/or limited to within) a bandwidth that is smaller than a bandwidth of a bandwidth part (e.g., an active bandwidth part of the UE). Alternatively and/or additionally, $N_{BWP,i}^{start}$ and/or $N_{BWP,i}^{size}$ may be used for VRB to PRB mapping (and/or S and/or Y may not be used for VRB to PRB mapping) when (and/or if) VRBs allocated to the UE would not spread across a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, $N_{BWP,i}^{start}$ and/or $N_{BWP,i}^{size}$ may be used for VRB to PRB mapping (and/or S and/or Y may not be used for VRB to PRB mapping) when (and/or if) VRBs allocated to the UE would not spread across a bandwidth larger than a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, $N_{BWP,i}^{start}$ and/or $N_{BWP,i}^{size}$ may be used for VRB to PRB mapping (and/or S and/or Y may not be used for VRB to PRB mapping) when (and/or if) enablement and/or usage of the interleaved mapping would not cause resources (e.g., VRBs and/or PRBs) to be allocated to the UE, where the resources would spread across a bandwidth that defines resource allocation for the UE (e.g., the bandwidth that defines resource allocation for the UE may be a bandwidth to which resource allocation for the UE is limited, such as a bandwidth to which resource allocation for the UE is confined). Alternatively and/or additionally, $N_{BWP,i}^{start}$ and/or $N_{BWP,i}^{size}$ may be used for VRB to PRB mapping (and/or S and/or Y may not be used for VRB to PRB mapping) when (and/or if) enablement and/or usage of the interleaved mapping would not cause resources (e.g., VRBs and/or PRBs) to be allocated to the UE, where the resources would spread across a bandwidth larger than a bandwidth that defines resource allocation for the UE (e.g., the bandwidth that defines resource allocation for the UE may be a bandwidth to which resource allocation for the UE is limited, such as a bandwidth to which resource allocation for the UE is confined).

In the first example for mapping (e.g., interleaved VRB-to-PRB mapping), a base station may indicate (to the UE, for example) whether S or $N_{BWP,i}^{start}$ is to be used for VRB to PRB mapping (e.g., the base station may instruct the UE to use S for VRB to PRB mapping or the base station may instruct the UE to use $N_{BWP,i}^{start}$ for VRB to PRB mapping). A base station may indicate (to the UE, for example) whether Y or $N_{BWP,i}^{size}$ is to be used for VRB to PRB mapping (e.g., the base station may instruct the UE to use Y for VRB to PRB mapping or the base station may instruct the UE to use $N_{BWP,i}^{size}$ for VRB to PRB mapping). Alternatively and/or additionally, a base station and/or the UE may determine whether S or $N_{BWP,i}^{start}$ is to be used for VRB to PRB mapping. Alternatively and/or additionally, a base station and/or the UE may determine whether Y or $N_{BWP,i}^{size}$ is to be used for VRB to PRB mapping. The determination (of whether to use S or $N_{BWP,i}^{start}$ for VRB to PRB mapping and/or whether to use Y or $N_{BWP,i}^{size}$ for VRB to PRB mapping) may be based on one or more conditions (e.g., one or more specified conditions), such as based on at least one of whether or not a bandwidth of a set of PRBs that can be processed by the UE is smaller than a bandwidth of a bandwidth part (e.g., an active bandwidth part of the UE), whether or not the UE receives an indication of a subset of frequency resources within the bandwidth part used for resource allocation (e.g., derived resource allocation), whether or not a bandwidth of the UE is defined by (e.g., confined and/or limited to within) a bandwidth that is smaller than a bandwidth of a bandwidth part (e.g., an active bandwidth part of the UE), whether or not VRBs allocated to the UE would spread across a bandwidth that defines resource allocation for the UE (e.g., the bandwidth that defines resource allocation for the UE may be a bandwidth to which resource allocation for the UE is limited, such as a bandwidth to which resource allocation for the UE is confined), whether or not VRBs allocated to the UE would spread across a bandwidth larger than a bandwidth that defines resource allocation for the UE (e.g., the bandwidth that defines resource allocation for the UE may be a bandwidth to which resource allocation for the UE is limited, such as a bandwidth to which resource allocation for the UE is confined), etc.

With respect to the first example for mapping (e.g., interleaved VRB-to-PRB mapping), the bandwidth part may be an active bandwidth part. Alternatively and/or additionally, the bandwidth part may be a bandwidth part that the UE is using. Alternatively and/or additionally, the bandwidth part may be a bandwidth part for resource allocation. Alternatively and/or additionally, the bandwidth part may be a bandwidth part for a data channel. Alternatively and/or additionally, the bandwidth part may be a bandwidth part where a transmission or reception is scheduled.

In a second example for mapping (e.g., interleaved mapping for frequency hopping, such as intra-slot frequency hopping), in a scenario associated with intra-slot frequency hopping, a starting Resource Block (RB) in each hop may be given by $$RB_{start} = \begin{cases} RB_{start} & i = 0 \\ S + [(RB_{start} + RB_{offset}) \bmod L] & i = 1 \end{cases}$$

where: (i) i=0 is the first hop (e.g., initial hop) and i=1 is the second hop (following, such as directly following, the first hop, for example), (ii) $RB_{start}$ is the starting RB within the uplink (UL) bandwidth part, as calculated from the resource block assignment information of resource allocation type 1 (such as discussed in Clause 6.1.2.2.2 of 3GPP TS 38.214 V16.2.0) or as calculated from the resource assignment for MsgA Physical Uplink Shared Channel (PUSCH) (such as discussed in 3GPP TS 38.213 V16.2.0), and/or (iii) $RB_{offset}$ is the frequency offset (in units of RBs, for example) between the first hop and the second hop. S may be a starting PRB of a subset of resources. L may be a size and/or bandwidth of the subset of resources.

In a third example for mapping (e.g., interleaved mapping for frequency hopping, such as intra-slot frequency hopping), the mapping may be performed based on $r_{PUCCH}$.

For example, in the third example for mapping (e.g., interleaved mapping for frequency hopping, such as intra-slot frequency hopping), if $\lfloor r_{PUCCH}/8 \rfloor = 0$ and if a UE is provided with a Physical Uplink Control Channel (PUCCH) resource by pucch-ResourceCommon and is not provided with useInterlacePUCCHCommon-r16: (i) the UE determines a PRB index of a PUCCH transmission in the first hop (e.g., initial hop) to be $RB_{BWP}^{offset} + \lfloor r_{PUCCH}/N_{CS} \rfloor$, and/or the UE determines a PRB index of a PUCCH transmission in the second hop (e.g., a hop following, such as directly following, the initial hop) to be $S+S+L-1-RB_{BWP}^{offset} - \lfloor r_{PUCCH}/N_{CS} \rfloor$, where $RB_{BWP}^{offset}$ may be a frequency offset between the first hop and the second hop, $N_{CS}$ may be a total number of initial cyclic shift indexes in a set of initial cyclic shift indexes, S may be a starting PRB of a subset of resources and/or L may be a size and/or bandwidth of the subset of resources, and/or (ii) the UE determines an initial cyclic shift index in the set of initial cyclic shift indexes to be $r_{PUCCH} \bmod N_{CS}$.

Alternatively and/or additionally, in the third example for mapping (e.g., interleaved mapping for frequency hopping, such as intra-slot frequency hopping), if $\lfloor r_{PUCCH}/8 \rfloor = 1$ and if a UE is provided with a PUCCH resource by pucch-ResourceCommon and is not provided useInterlacePUCCH-PUSCH in BWP-UplinkCommon: (1) the UE determines a PRB index of a PUCCH transmission in the first hop (e.g., initial hop) to be $S+S+L-1-RB_{BWP}^{offset} - \lfloor (r_{PUCCH}-8)/N_{CS} \rfloor$ and/or the UE determines a PRB index of a PUCCH transmission in the second hop (e.g., a hop following, such as directly following, the initial hop) to be $RB_{BWP}^{offset} - \lfloor (r_{PUCCH}-8)/N_{CS} \rfloor$, where $RB_{BWP}^{offset}$ may be a frequency offset between the first hop and the second hop, $N_{CS}$ may be a total number of initial cyclic shift indexes in a set of initial cyclic shift indexes, S may be a starting PRB of a subset of resources and/or L may be a size and/or bandwidth of the subset of resources, and/or (ii) the UE determines an initial cyclic shift index in the set of initial cyclic shift indexes to be $(r_{PUCCH}-8) \bmod N_{CS}$.

A baseband of a UE may operate at a smaller bandwidth than a bandwidth of RF (and/or a bandwidth of the baseband may be a portion of the bandwidth of the RF). RF (and/or a bandwidth of the RF) may cover a bandwidth of a bandwidth part. The baseband (e.g., IFFT and/or FFT), and/or a bandwidth of the baseband, may cover a subset of resources within the bandwidth part. For example, a RF of a UE (and/or a bandwidth of the RF) may cover a bandwidth of 3.2 GHz, and a baseband of the UE (and/or a bandwidth of the baseband) may cover a bandwidth of 0.8 GHz.

Throughout the present disclosure, the term "window" can be replaced with "a set of frequency resources" and/or "a set of PRBs and/or CRBs". A window may occupy a subset of frequency resources within a bandwidth part.

Throughout the present disclosure, a subset of frequency resources may be a set of one or more frequency resources.

In a first embodiment, a UE receives a configuration of a bandwidth part from a base station. The UE may receive an indication of a second subset of resources within the bandwidth part. The second subset of resources may be used for determining (e.g., deriving) a mapping between VRB and PRB. A starting location of the second subset of resources may be used for determining (e.g., deriving) a mapping between VRB and PRB. A size and/or bandwidth of the second subset of resources is used for determining (e.g., deriving) a mapping between VRB and PRB. The starting location and/or the bandwidth of the second subset of resources may be used for determining (e.g., deriving) a mapping between VRB and PRB. The bandwidth of the second subset of resources may be smaller than a bandwidth of the bandwidth part. The starting position of the second subset of resources is a PRB and/or CRB (e.g., one PRB and/or CRB) within the bandwidth part. The starting position of the second subset of resources may be different from a lowest PRB and/or CRB of the bandwidth part (and/or the starting position of the second subset of resources may be different from a starting PRB and/or CRB of the bandwidth part). The UE may receive an indication of a first subset of frequency resources within the bandwidth part. The UE may determine (e.g., derive) a resource allocation within a first subset of resources. The first subset of resources may be the same as the second subset of resources. The same indication may be used to indicate the first subset of resources and the second subset of resources if the first subset of resources is the same as the second subset of resources. The first subset of resources may be different from the second subset of resources. The resource allocation may be for a data channel received or transmitted by the UE. The UE may not be scheduled (and/or may not be allowed and/or configured to be scheduled) outside the first subset of frequency resources. The UE may not be scheduled with (and/or may not be allowed and/or configured to be scheduled with) a VRB and/or PRB (e.g., one VRB and/or PRB) that is outside the first subset of frequency resources within the bandwidth part. The first subset of frequency resources may be a set of contiguous frequency resources. The second subset of frequency resources may be a set of contiguous frequency resources. The first subset of resources may be a window. The second subset of resources may be a window. The first subset of frequency resources may comprise a set of contiguous PRBs. The second subset of frequency resources may comprise a set of contiguous PRBs. A frequency location of the first subset of frequency resources may be indicated to the UE (e.g., an indication of the frequency location of the first subset of frequency resources may be transmitted to the UE). A frequency location of the first subset of frequency resources and/or a frequency location of the second subset of frequency resources may be indicated by a DCI (e.g., a DCI transmitted to the UE may comprise an indication of the frequency location of the first subset of frequency resources and/or an indication of the frequency location of the second subset of frequency resources). A first PRB (e.g., an initial and/or starting PRB) of the first subset of frequency resources may be indicated to the UE (e.g., an indication of the first PRB of the first subset of frequency resources may be transmitted to the UE). A first PRB (e.g., an initial and/or starting PRB) of the second subset of frequency resources may be indicated to the UE (e.g., an indication of the first PRB of the second subset of frequency resources may be transmitted to the UE). A first PRB (e.g., an initial and/or starting PRB) of the first subset of frequency resources and/or a first PRB (e.g., an initial and/or starting PRB) of the second subset of frequency resources may be indicated by a DCI (e.g., a DCI transmitted to the UE may comprise an indication of the first PRB of the first subset of frequency resources and/or an indication of the first PRB of the second subset of frequency resources). A bandwidth of the first subset of frequency resources may be fixed and/or pre-defined. A bandwidth of the second subset of frequency resources may be fixed and/or pre-defined. A bandwidth of the first subset of frequency resources may be indicated to the UE (e.g., an indication of the bandwidth of the first subset of frequency resources may be transmitted to the UE). A bandwidth of the second subset of frequency resources may be indicated to the UE (e.g., an indication of the bandwidth of the second subset of frequency resources may be transmitted to the UE). A bandwidth of the first subset of frequency resources and/or a bandwidth of the second subset of frequency resources may be indicated by a Radio Resource Control (RRC) configuration (e.g., a RRC configuration with which the UE is configured may be indicative of the bandwidth of the first subset of frequency resources and/or the bandwidth of the second subset of frequency resources). A bandwidth of the first subset of frequency resources and/or a bandwidth of the second subset of frequency resources may be indicated by a DCI (e.g., a DCI transmitted to the UE may comprise an indication of the bandwidth of the first subset of frequency resources and/or an indication of the bandwidth of the second subset of frequency resources). The first subset of frequency resources and/or the second subset of frequency resources may have a smaller bandwidth than a bandwidth of the bandwidth part. The bandwidth part may be an active bandwidth part (of the UE, for example). The first subset of frequency resources and/or the second subset of frequency resources may be indicated by a DCI (e.g., a DCI transmitted to the UE may comprise an indication of the first subset of frequency resources and/or an indication of the second subset of frequency resources). In some examples, the DCI schedules one or more resources for the UE. Alternatively and/or additionally, the DCI may indicate resource allocation within the first subset of frequency resources and/or the second subset of frequency resources. A bitmap in the DCI may indicate resource allocation within the first subset of frequency resources. In some examples, a bit-width of the bitmap and/or a size of the bitmap is based on (e.g., determined based on) the bandwidth of the first subset of frequency resources. A resource indicator value (RIV) value in the DCI may indicate resource allocation within the first subset of frequency resources. In some examples, a bit-width of the RIV value and/or a size of the RIV value is based on (e.g., determined based on) the bandwidth of the first subset of frequency resources. In some examples, a frequency location of the first subset of frequency resources and a resource allocation within the first subset of frequency resources are indicated by two separate fields in the DCI (e.g., a first field may be indicative of the frequency location of the first subset of frequency resources and a second field may be indicative of the resource allocation within the first subset of frequency resources). In some examples, the frequency location of the first subset of frequency resources and the resource allocation within the first subset of frequency resources are indicated by two separate sets of bits in the DCI (e.g., a first set of one or more bits may be indicative of the frequency location of the first subset of frequency resources and a second set of one or more bits may be indicative of the resource allocation within the first subset of frequency resources, wherein the first set of one or more bits and the second set of one or more bits may be in the same field of the DCI or in separate fields of the DCI). The second set of resources may be determined (e.g., derived) based on a resource allocation field in a DCI.

In a second embodiment, a base station transmits a configuration of a bandwidth part to a UE. A base station may transmit (to the UE, for example) an indication of a second subset of resources within the bandwidth part. The second subset of resources may be used for determining (e.g., deriving) a mapping between VRB and PRB. A starting location of the second subset of resources may be used for determining (e.g., deriving) a mapping between VRB and PRB. A size and/or bandwidth of the second subset of resources may be used for determining (e.g., deriving) a mapping between VRB and PRB. The starting location and/or the bandwidth of the second subset of resources may be used for determining (e.g., deriving) a mapping between VRB and PRB. The bandwidth of the second subset of resources may be smaller than a bandwidth of the bandwidth part. The starting position of the second subset of resources is a PRB and/or CRB (e.g., one PRB and/or CRB) within the bandwidth part. The starting position of the second subset of resources may be different from a lowest PRB and/or CRB of the bandwidth part (and/or the starting position of the second subset of resources may be different from a starting PRB and/or CRB of the bandwidth part). The base station may transmit (to the UE, for example) an indication of a first subset of frequency resources within the bandwidth part. The base station may determine and/or indicate (e.g., indicate to the UE) a resource allocation within a first subset of resources. The first subset of resources may be the same as the second subset of resources. The same indication may be used to indicate the first subset of resources and the second subset of resources if the first subset of resources is the same as the second subset of resources. The first subset of resources may be different from the second subset of resources. The resource allocation may be for a data channel received or transmitted by the UE. The base station may not schedule (and/or may not be allowed and/or configured to schedule) outside the first subset of frequency resources. Alternatively and/or additionally, the base station may not schedule (and/or may not be allowed and/or configured to schedule) the UE outside the first subset of frequency resources. The base station may not schedule (and/or may not be allowed and/or configured to schedule) a VRB outside the first subset of frequency resources. Alternatively and/or additionally, the base station may not schedule (and/or may not be allowed and/or configured to schedule) the UE with a VRB outside the first subset of frequency resources. The base station may not schedule (and/or may not be allowed and/or configured to schedule) outside the second subset of frequency resources. Alternatively and/or additionally, the base station may not schedule (and/or may not be allowed and/or configured to schedule) the UE outside the second subset of frequency resources. The base station is not allowed to schedule PRB outside the second subset of frequency resources. The base station may not schedule (and/or may not be allowed and/or configured to schedule) the UE in a way that a PRB is mapped outside the second subset of frequency resources. For example, the base station may not schedule (and/or may not be allowed and/or configured to schedule) the UE with a PRB mapped outside the second subset of frequency resources. The base station may not schedule (and/or may not be allowed and/or configured to schedule) a VRB and/or PRB (e.g., one VRB and/or PRB) that is outside the first subset of frequency resources within the bandwidth part. For example, the base station may not schedule (and/or may not be allowed and/or configured to schedule) the UE with a VRB and/or PRB (e.g., one VRB and/or PRB) that is outside the first subset of frequency resources within the bandwidth part. The first subset of frequency resources may be a set of contiguous frequency resources. The second subset of frequency resources may be a set of contiguous frequency resources. The first subset of resources may be a window. The second subset of resources may be a window. The first subset of frequency resources may comprise a set of contiguous PRBs. The second subset of frequency resources may comprise a set of contiguous PRBs. A frequency location of the first subset of frequency resources may be indicated to the UE (e.g., an indication of the frequency location of the first subset of frequency resources may be transmitted, by the base station, to the UE). A frequency location of the first subset of frequency resources and/or a frequency location of the second subset of frequency resources may be indicated by a DCI (e.g., a DCI transmitted, by the base station, to the UE may comprise an indication of the frequency location of the first subset of frequency resources and/or an indication of the frequency location of the second subset of frequency resources). A first PRB (e.g., an initial and/or starting PRB) of the first subset of frequency resources may be indicated to the UE (e.g., an indication of the first PRB of the first subset of frequency resources may be transmitted, by the base station, to the UE). A first PRB (e.g., an initial and/or starting PRB) of the second subset of frequency resources may be indicated to the UE (e.g., an indication of the first PRB of the second subset of frequency resources may be transmitted, by the base station, to the UE). A first PRB (e.g., an initial and/or starting PRB) of the first subset of frequency resources and/or a first PRB (e.g., an initial and/or starting PRB) of the second subset of frequency resources may be indicated by a DCI (e.g., a DCI transmitted, by the base station, to the UE may comprise an indication of the first PRB of the first subset of frequency resources and/or an indication of the first PRB of the second subset of frequency resources). A bandwidth of the first subset of frequency resources may be fixed and/or pre-defined. A bandwidth of the second subset of frequency resources may be fixed and/or pre-defined. A bandwidth of the first subset of frequency resources may be indicated to the UE (e.g., an indication of the bandwidth of the first subset of frequency resources may be transmitted, by the base station, to the UE). A bandwidth of the second subset of frequency resources may be indicated to the UE (e.g., an indication of the bandwidth of the second subset of frequency resources may be transmitted, by the base station, to the UE). A bandwidth of the first subset of frequency resources and/or a bandwidth of the second subset of frequency resources may be indicated by a RRC configuration (e.g., a RRC configuration with which the UE is configured may be indicative of the bandwidth of the first subset of frequency resources and/or the bandwidth of the second subset of frequency resources). A bandwidth of the first subset of frequency resources and/or a bandwidth of the second subset of frequency resources may be indicated by a DCI (e.g., a DCI transmitted, by the base station, to the UE may comprise an indication of the bandwidth of the first subset of frequency resources and/or an indication of the bandwidth of the second subset of frequency resources). The first subset of frequency resources and/or the second subset of frequency resources may have a smaller bandwidth than a bandwidth of the bandwidth part. The bandwidth part may be an active bandwidth part (of the UE, for example). The first subset of frequency resources and/or the second subset of frequency resources may be indicated by a DCI (e.g., a DCI transmitted, by the base station, to the UE may comprise an indication of the first subset of frequency resources and/or an indication of the second subset of frequency resources). In some examples, the DCI schedules one or more resources for the UE. Alternatively and/or additionally, the DCI may indicate resource allocation within the first subset of frequency resources and/or the second subset of frequency resources. A bitmap in the DCI may indicate resource allocation within the first subset of frequency resources. In some examples, a bit-width of the bitmap and/or a size of the bitmap is based on (e.g., determined based on) the bandwidth of the first subset of frequency resources. A RIV value in the DCI may indicate resource allocation within the first subset of frequency resources. In some examples, a bit-width of the RIV value and/or a size of the RIV value is based on (e.g., determined based on) the bandwidth of the first subset of frequency resources. In some examples, a frequency location of the first subset of frequency resources and a resource allocation within the first subset of frequency resources are indicated by two separate fields in the DCI (e.g., a first field may be indicative of the frequency location of the first subset of frequency resources and a second field may be indicative of the resource allocation within the first subset of frequency resources). In some examples, the frequency location of the first subset of frequency resources and the resource allocation within the first subset of frequency resources are indicated by two separate sets of bits in the DCI (e.g., a first set of one or more bits may be indicative of the frequency location of the first subset of frequency resources and a second set of one or more bits may be indicative of the resource allocation within the first subset of frequency resources, wherein the first set of one or more bits and the second set of one or more bits may be in the same field of the DCI or in separate fields of the DCI). The second set of resources may be determined (e.g., derived) based on a resource allocation field in a DCI.

In a third embodiment, a base station may not indicate (and/or may be prohibited from indicating) interleaved mapping, e.g., VRB to PRB mapping, to a UE. For example, the base station may not indicate (and/or may be prohibited from indicating) interleaved mapping (e.g., VRB to PRB mapping) to the UE if and/or when using (e.g., enabling and/or applying) interleaved mapping (e.g., VRB to PRB mapping) would result in PRBs being allocated to the UE, wherein a bandwidth of the PRBs allocated to the UE is larger than a bandwidth that the UE can process (e.g., the bandwidth of the PRBs exceeds a maximum bandwidth of PRBs that the UE is able to process). Alternatively and/or additionally, the base station may not indicate (and/or may be prohibited from indicating) interleaved mapping (e.g., VRB to PRB mapping) to the UE if and/or when using (e.g., enabling and/or applying) interleaved mapping (e.g., VRB to PRB mapping) would result in PRBs being allocated to the UE, wherein a bandwidth of the PRBs allocated to the UE exceeds a capability of the UE. Alternatively and/or additionally, the base station may not indicate (and/or may be prohibited from indicating) interleaved mapping (e.g., VRB to PRB mapping) to the UE if and/or when using (e.g., enabling and/or applying) interleaved mapping (e.g., VRB to PRB mapping) would result in PRBs being allocated to the UE, wherein a number of PRBs of the PRBs allocated to the UE is more than the UE can process (e.g., the number of PRBs of the PRBs allocated to the UE exceeds a maximum number of PRB s allocated to the UE that the UE is able to process). Alternatively and/or additionally, the base station may not indicate (and/or may be prohibited from indicating) interleaved mapping (e.g., VRB to PRB mapping) to the UE if and/or when using (e.g., enabling and/or applying) interleaved mapping (e.g., VRB to PRB mapping) would result in a number of PRBs allocated to the UE exceeding a capability of the UE. Alternatively and/or additionally, the base station may not indicate (and/or may be prohibited from indicating) interleaved mapping (e.g., VRB to PRB mapping) to the UE if and/or when (and/or after) a base station indicates, to the UE, a subset of resources within a bandwidth part of the UE (e.g., an active bandwidth part of the UE). Resource allocation for the UE may be performed within the subset of resources. For example, one or more resources within the subset of resources may be allocated to the UE and/or resources outside the subset of resources may not be allocated to the UE. For example, the base station may not be configured and/or allowed to allocate a resource, outside the subset of the resources, to the UE. Alternatively and/or additionally, the base station may not indicate (and/or may be prohibited from indicating) interleaved mapping (e.g., VRB to PRB mapping) to the UE if and/or when (and/or after) a base station indicates, to the UE, that resource allocation is performed within a subset of resources of a bandwidth part of the UE (e.g., an active bandwidth part of the UE).

Throughout the present disclosure, the present disclosure may describe behavior and/or operation of a single serving cell unless otherwise noted.

Throughout the present disclosure, the present disclosure may describe behavior and/or operation of multiple serving cells unless otherwise noted.

Throughout the present disclosure, the present disclosure may describe behavior and/or operation of a single bandwidth part unless otherwise noted.

Throughout the present disclosure, a base station may configure a UE with multiple bandwidth parts unless otherwise noted.

Throughout the present disclosure, interleaved mapping and/or distributed mapping (e.g., Distributed Virtual Resource Block (DVRB) mapping and/or frequency hopping) may be applied for downlink (DL) transmission and/or uplink transmission (e.g., at least one of PDSCH, PUSCH, Physical Downlink Control Channel (PDCCH), PUCCH).

Throughout the present disclosure, a base station may configure a UE with a single bandwidth part unless otherwise noted.

One, some and/or all of the foregoing techniques and/or embodiments can be formed to a new embodiment.

In some examples, embodiments disclosed herein, such as embodiments described with respect to the first concept, the second concept, the first embodiment, the second embodiment and the third embodiment, may be implemented independently and/or separately. Alternatively and/or additionally, a combination of embodiments described herein, such as embodiments described with respect to the first concept, the second concept, the first embodiment, the second embodiment and/or the third embodiment, may be implemented. Alternatively and/or additionally, a combination of embodiments described herein, such as embodiments described with respect to the first concept, the second concept, the first embodiment, the second embodiment and/or the third embodiment, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 6:
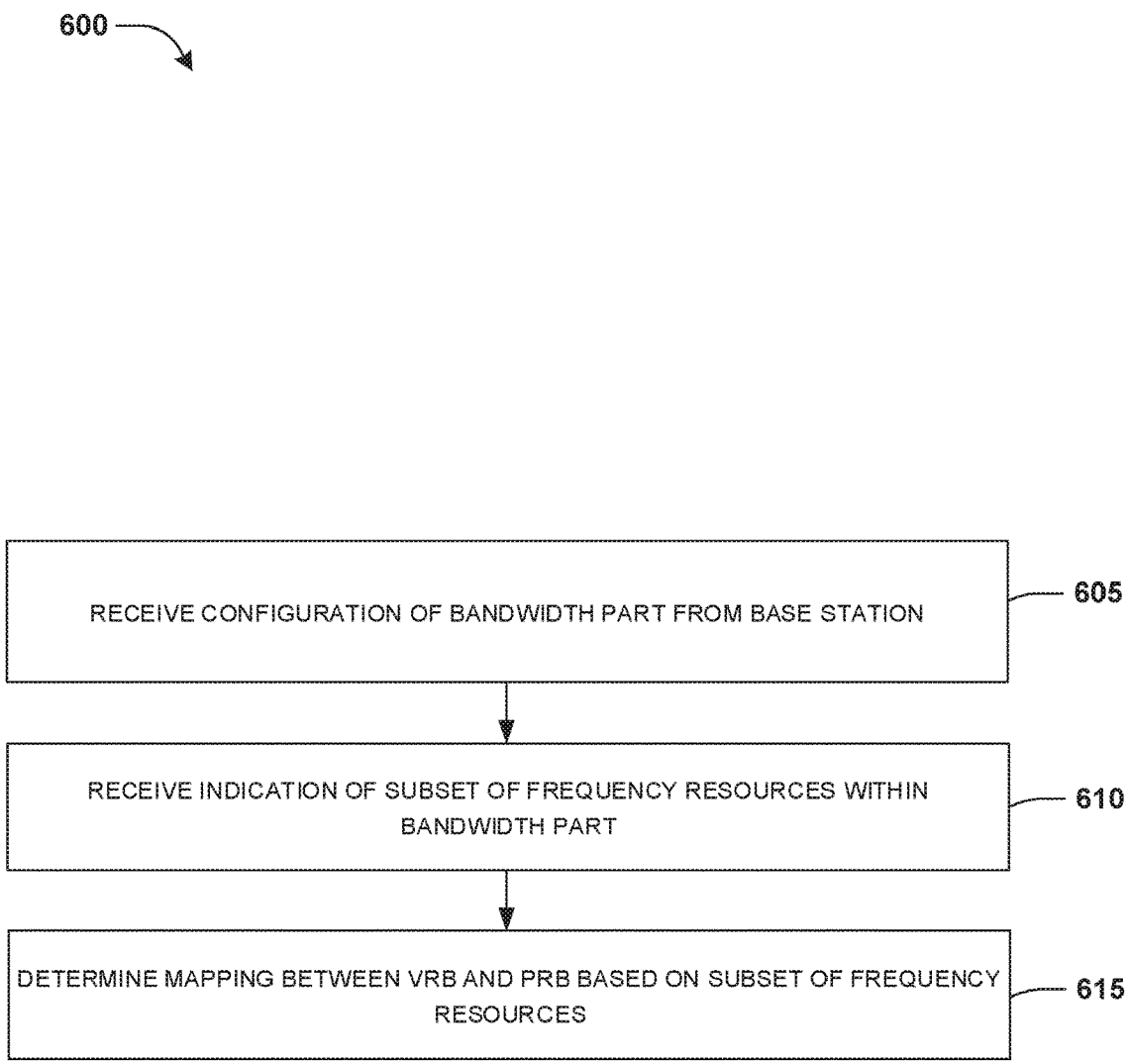
FIG. 6 is a flow chart according to one exemplary embodiment.

FIG. 6 is a flow chart 600 according to one exemplary embodiment from the perspective of a UE. In step 605, the UE receives a configuration of a bandwidth part from a base station. In step 610, the UE receives an indication of a subset of frequency resources (e.g., a subset of one or more frequency resources) within the bandwidth part. In step 615, the UE determines (e.g., derives) a mapping between VRB and PRB based on the subset of frequency resources.

Referring back to FIGS. 3 and 4, in one exemplary embodiment of a UE, the device 300 includes a program code 312 stored in the memory 310. The CPU 308 may execute program code 312 to enable the UE (i) to receive a configuration of a bandwidth part from a base station, (ii) to receive an indication of a subset of frequency resources (e.g., a subset of one or more frequency resources) within the bandwidth part, and (iii) to determine (e.g., derive) a mapping between VRB and PRB based on the subset of frequency resources. Furthermore, the CPU 308 can execute the program code 312 to perform one, some and/or all of the above-described actions and steps and/or others described herein.

Figure 7:
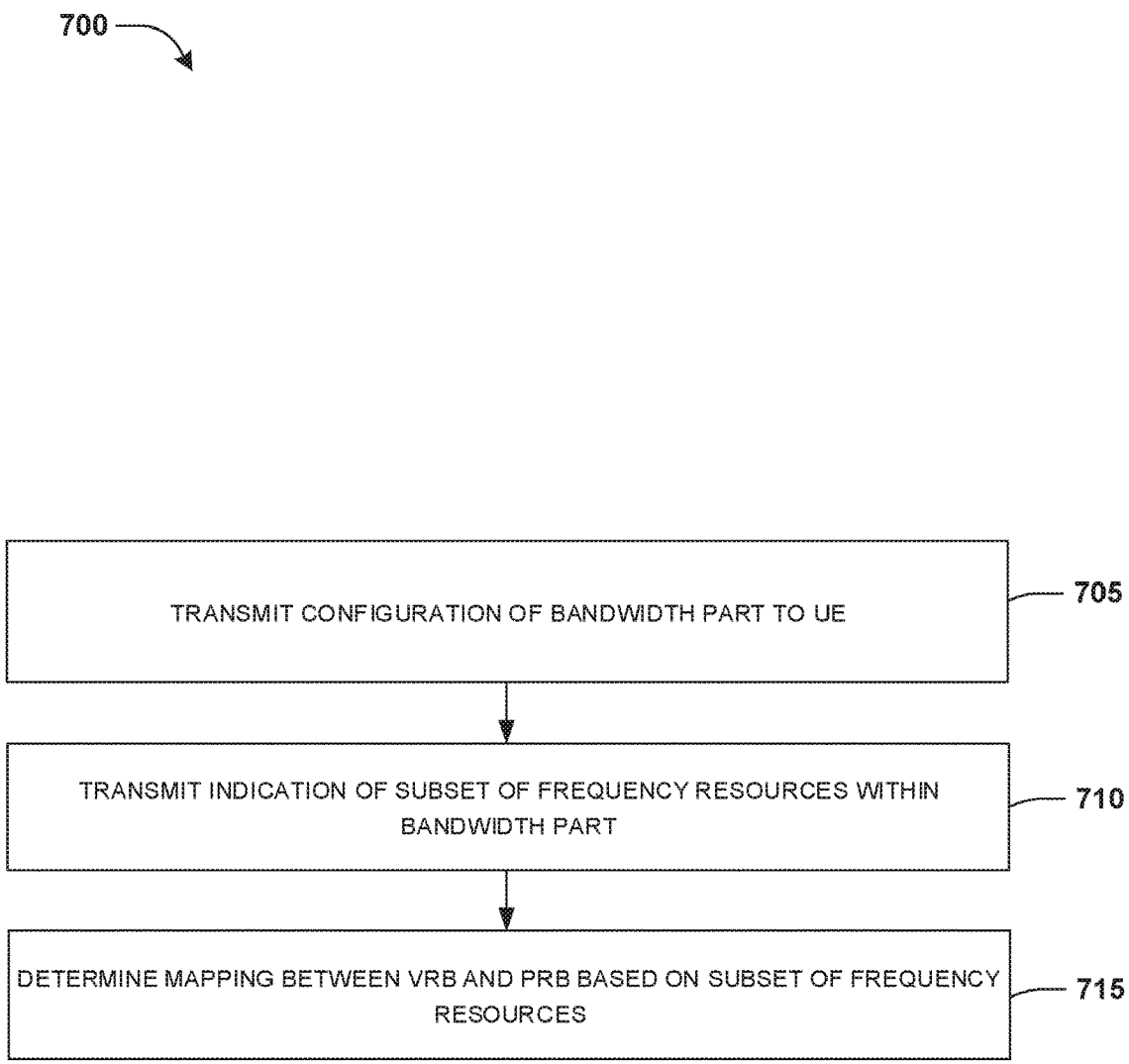
FIG. 7 is a flow chart according to one exemplary embodiment.

FIG. 7 is a flow chart 700 according to one exemplary embodiment from the perspective of a base station. In step 705, the base station transmits a configuration of a bandwidth part to a UE. In step 710, the base station transmits (to the UE, for example) an indication of a subset of frequency resources (e.g., a subset of one or more frequency resources) within the bandwidth part. In step 715, the base station determines (e.g., derives) a mapping between VRB and PRB based on the subset of frequency resources.

Referring back to FIGS. 3 and 4, in one exemplary embodiment of a base station, the device 300 includes a program code 312 stored in the memory 310. The CPU 308 may execute program code 312 to enable the base station (i) to transmit a configuration of a bandwidth part to a UE, (ii) to transmit an indication of a subset of frequency resources (e.g., a subset of one or more frequency resources) within the bandwidth part, and (iii) to determine (e.g., derive) a mapping between VRB and PRB based on the subset of frequency resources. Furthermore, the CPU 308 can execute the program code 312 to perform one, some and/or all of the above-described actions and steps and/or others described herein.

With respect to FIGS. 6-7, in one embodiment, the mapping is based on a starting location of the subset of frequency resources.

In one embodiment, the mapping is based on a size of the subset of frequency resources.

In one embodiment, the subset of frequency resources is a set of contiguous resources (e.g., a set of contiguous PRBs, VRBs and/or CRBs).

In one embodiment, a bandwidth and/or size of the subset of frequency resources is smaller than a bandwidth and/or size of the bandwidth part.

In one embodiment, a starting location of the subset of frequency resources is different from a starting location of the bandwidth part.

In one embodiment, a first PRB of the subset of frequency resources (e.g., an initial and/or starting PRB of the subset of frequency resources) is indicated to the UE.

In one embodiment, a bandwidth of the subset of frequency resources is fixed and/or pre-defined.

In one embodiment, a bandwidth of the subset of frequency resources is indicated to the UE (e.g., the bandwidth may be indicated to the UE via the indication or a different indication transmitted to the UE).

In one embodiment, a bandwidth of the subset of frequency resources is indicated by a RRC configuration (e.g., the RRC configuration, indicative of the bandwidth, may be transmitted to the UE and/or the UE may be configured with the RRC configuration indicative of the bandwidth).

In one embodiment, the bandwidth part is an active bandwidth part (e.g., an active bandwidth part of the UE).

In one embodiment, the subset of frequency resources is indicated by a DCI (e.g., the DCI, transmitted to the UE, may comprise the indication of the subset of frequency resources).

In one embodiment, the DCI schedules one or more resources for the UE.

In one embodiment, the DCI is indicative of resource allocation within the subset of frequency resources. For example, the DCI may allocate (and/or indicate) one or more resources, within the subset of frequency resources, to the UE (e.g., the one or more resources may be allocated for one or more transmissions, such as one or more downlink transmissions and/or one or more uplink transmissions).

In one embodiment, a bitmap in the DCI is indicative of resource allocation within the subset of frequency resources. For example, the bitmap in the DCI may allocate (and/or indicate) one or more resources, within the subset of frequency resources, to the UE (e.g., the one or more resources may be allocated for one or more transmissions, such as one or more downlink transmissions and/or one or more uplink transmissions).

In one embodiment, a bit-width and/or size of the bitmap is based on the bandwidth and/or size of the subset of frequency resources (e.g., the bit-width and/or size of the bitmap is determined based on the bandwidth and/or size of the subset of frequency resources).

In one embodiment, an RIV value in the DCI is indicative of resource allocation within the subset of frequency resources. For example, the RIV value in the DCI may allocate (and/or indicate) one or more resources, within the subset of frequency resources, to the UE (e.g., the one or more resources may be allocated for one or more transmissions, such as one or more downlink transmissions and/or one or more uplink transmissions).

In one embodiment, the DCI is indicative of resource allocation within a second subset of frequency resources (e.g., a second subset of one or more frequency resources that may be different from the subset of frequency resources). For example, the DCI may allocate (and/or indicate) one or more resources, within the second subset of frequency resources, to the UE (e.g., the one or more resources may be allocated for one or more transmissions, such as one or more downlink transmissions and/or one or more uplink transmissions).

In one embodiment, a bitmap in the DCI is indicative of resource allocation within a second subset of frequency resources (e.g., a second subset of one or more frequency resources that may be different from the subset of frequency resources). For example, the bitmap in the DCI may allocate (and/or indicate) one or more resources, within the second subset of frequency resources, to the UE (e.g., the one or more resources may be allocated for one or more transmissions, such as one or more downlink transmissions and/or one or more uplink transmissions).

In one embodiment, a bit-width and/or size of the bitmap is based on a bandwidth and/or size of the second subset of frequency resources (e.g., the bit-width and/or size of the bitmap is determined based on the bandwidth and/or size of the second subset of frequency resources).

In one embodiment, an RIV value in the DCI is indicative of resource allocation within a second subset of frequency resources (e.g., a second subset of one or more frequency resources that may be different from the subset of frequency resources). For example, the RIV value in the DCI may allocate (and/or indicate) one or more resources, within the second subset of frequency resources, to the UE (e.g., the one or more resources may be allocated for one or more transmissions, such as one or more downlink transmissions and/or one or more uplink transmissions).

In one embodiment, after the mapping is determined and/or applied (and/or when the mapping is applied and/or used by the UE), the subset of frequency resources is used to define (e.g., limit and/or confine) an allocated bandwidth (e.g., a bandwidth of the allocated bandwidth), such as a bandwidth allocated to the UE. For example, the allocated bandwidth may be defined by (e.g., limited and/or confined to within) a bandwidth of the subset of frequency resources.

In one embodiment, allocated PRBs after the mapping are within the subset of frequency resources. For example, one or more PRBs, within the subset of frequency resources, are allocated to the UE after determining and/or applying the mapping (and/or when the mapping is applied and/or used by the UE). For example, after the mapping is determined and/or applied (and/or when the mapping is applied and/or used by the UE), PRBs that are within the subset of frequency resources may be allocated to the UE and/or PRBs that are outside the subset of frequency resources may not be allocated to the UE.

Figure 8:
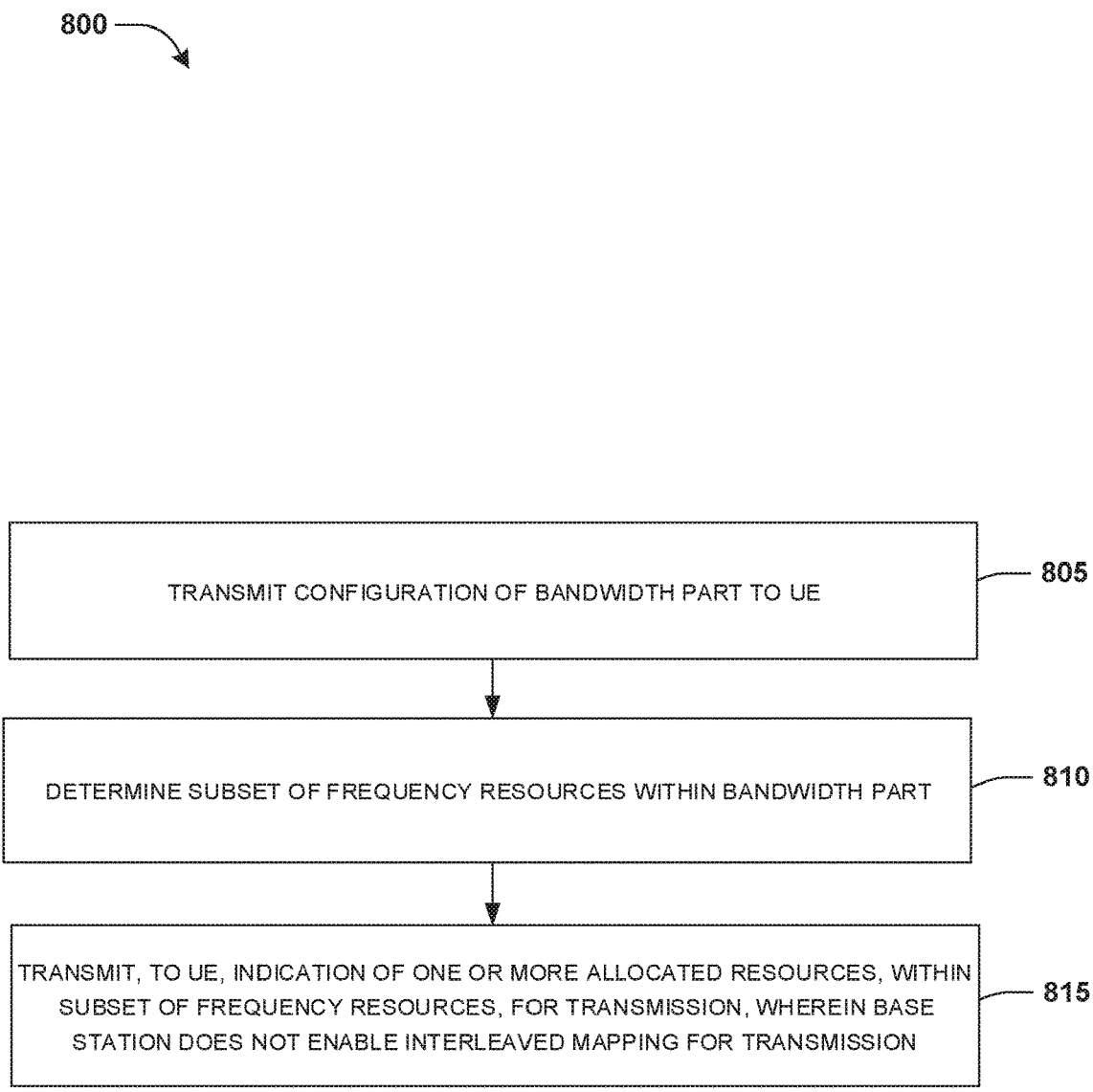
FIG. 8 is a flow chart according to one exemplary embodiment.

FIG. 8 is a flow chart 800 according to one exemplary embodiment from the perspective of a base station. In step 805, the base station transmits a configuration of a bandwidth part to a UE. In step 810, the base station determines (e.g., derives) a subset of frequency resources (e.g., a subset of one or more frequency resources) within the bandwidth part. For example, the subset of frequency resources may be a subset of the bandwidth part (and/or a bandwidth of the subset of frequency resources may correspond to a portion of a bandwidth of the bandwidth part). In step 815, the base station transmits, to the UE, an indication of one or more allocated resources, within the subset of frequency resources, for a transmission. For example, the subset of frequency resources may comprise the one or more allocated resources (and/or the subset of frequency resources may comprise one or more frequency resources of the one or more allocated resources). Alternatively and/or additionally, the indication may allocate the one or more allocated resources for the transmission (e.g., the one or more allocated resources may be allocated to the UE for the transmission and/or the UE may perform the transmission using the one or more allocated resources). The base station does not enable interleaved mapping (associated with the UE, for example) for the transmission. For example, the base station is not configured (and/or is not allowed to) enable the interleaved mapping for the transmission.

In one embodiment, the base station does not enable (and/or is not configured and/or allowed to enable) the interleaved mapping for the transmission based on determining (e.g., deriving) the subset of frequency resources within the bandwidth part. For example, the base station does not enable (and/or is not configured and/or allowed to enable) the interleaved mapping for the transmission based on the subset of frequency resources being within the bandwidth part.

In one embodiment, the base station does not enable (and/or is not configured and/or allowed to enable) the interleaved mapping for the transmission if the base station determines (e.g., derives) the subset of frequency resources within the bandwidth part. For example, the base station does not enable (and/or is not configured and/or allowed to enable) the interleaved mapping for the transmission if the subset of frequency resources is within the bandwidth part.

In one embodiment, the base station does not enable (and/or is not configured and/or allowed to enable) the interleaved mapping for the transmission based on a maximum bandwidth of the UE being smaller than a bandwidth of the bandwidth part. For example, the maximum bandwidth may correspond to a maximum bandwidth that the UE is able to process.

In one embodiment, the base station does not enable (and/or is not configured and/or allowed to enable) the interleaved mapping for the transmission if a maximum bandwidth of the UE is smaller than a bandwidth of the bandwidth part. For example, the maximum bandwidth may correspond to a maximum bandwidth that the UE is able to process.

In one embodiment, the transmission is a PUSCH transmission.

In one embodiment, the transmission is a PUCCH transmission.

In one embodiment, the interleaved mapping corresponds to an interleaved mapping for frequency hopping for uplink transmission (and/or the interleaved mapping is frequency hopping for uplink transmission).

Referring back to FIGS. 3 and 4, in one exemplary embodiment of a base station, the device 300 includes a program code 312 stored in the memory 310. The CPU 308 may execute program code 312 to enable the base station (i) to transmit a configuration of a bandwidth part to a UE, (ii) to determine (e.g., derive) a subset of frequency resources (e.g., a subset of one or more frequency resources) within the bandwidth part, and (iii) to transmit, to the UE, an indication of one or more allocated resources, within the subset of frequency resources, for a transmission, wherein the base station does not enable interleaved mapping for the transmission. Furthermore, the CPU 308 can execute the program code 312 to perform one, some and/or all of the above-described actions and steps and/or others described herein.

Figure 9:
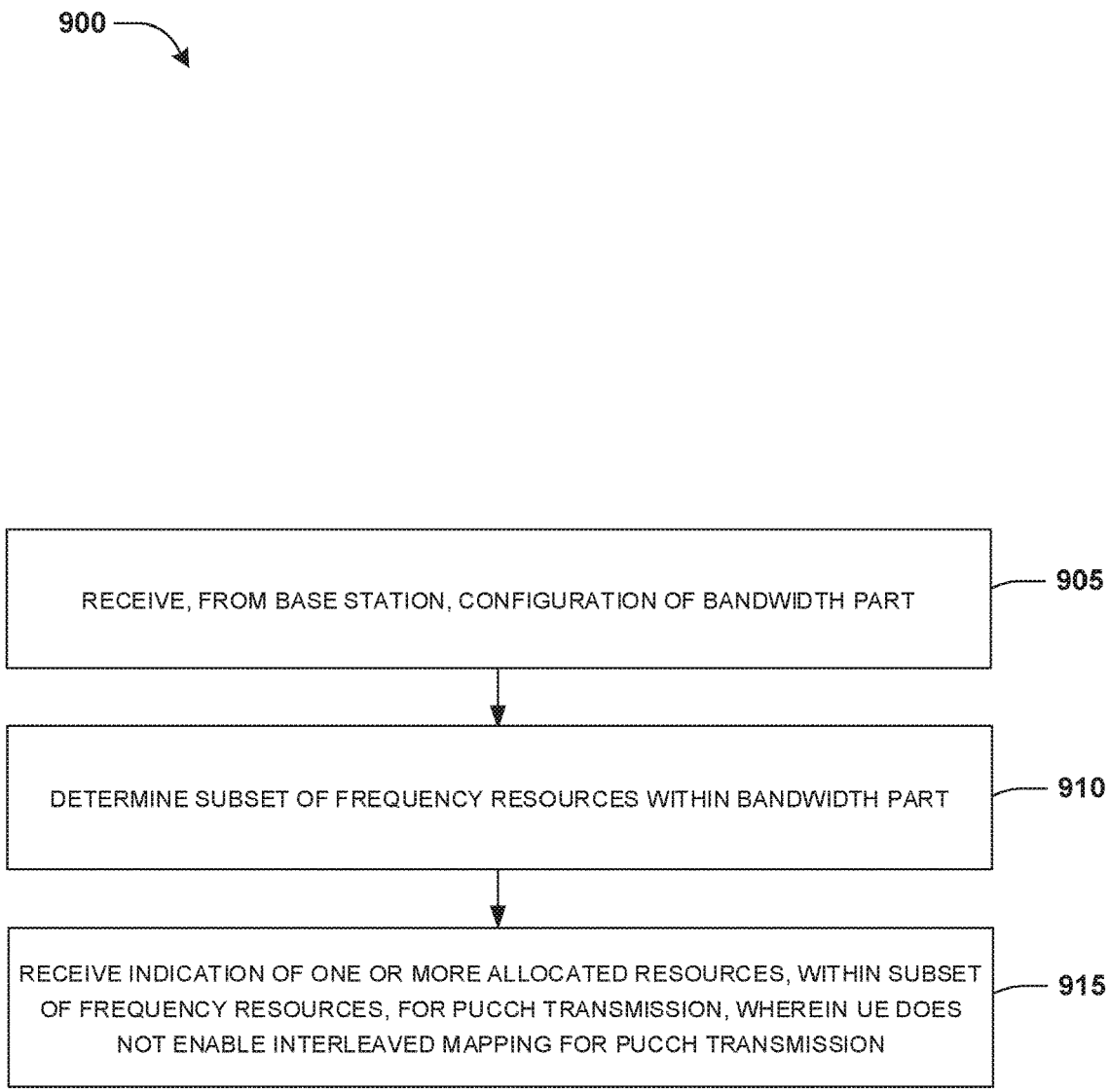
FIG. 9 is a flow chart according to one exemplary embodiment.

FIG. 9 is a flow chart 900 according to one exemplary embodiment from the perspective of a UE. In step 905, the UE receives, from a base station, a configuration of a bandwidth part. In step 910, the UE determines (e.g., derives) a subset of frequency resources (e.g., a subset of one or more frequency resources) within the bandwidth part. For example, the subset of frequency resources may be a subset of the bandwidth part (and/or a bandwidth of the subset of frequency resources may correspond to a portion of a bandwidth of the bandwidth part). In step 915, the UE receives an indication of one or more allocated resources, within the subset of frequency resources, for a PUCCH transmission. For example, the subset of frequency resources may comprise the one or more allocated resources (and/or the subset of frequency resources may comprise one or more frequency resources of the one or more allocated resources). Alternatively and/or additionally, the indication may allocate the one or more allocated resources for the PUCCH transmission (e.g., the one or more allocated resources may be allocated to the UE for the PUCCH transmission and/or the UE may perform the PUCCH transmission using the one or more allocated resources). The UE does not enable interleaved mapping for the PUCCH transmission. For example, the UE may not determine and/or use the interleaved mapping to perform the PUCCH transmission (and/or the PUCCH transmission may not be performed using the interleaved mapping).

In one embodiment, the UE does not enable the interleaved mapping for the PUCCH transmission based on determining (e.g., deriving) the subset of frequency resources within the bandwidth part. For example, the UE does not enable the interleaved mapping for the PUCCH transmission based on the subset of frequency resources being within the bandwidth part.

In one embodiment, the UE does not enable the interleaved mapping for the PUCCH transmission if the UE determines (e.g., derives) the subset of frequency resources within the bandwidth part. For example, the UE does not enable the interleaved mapping for the PUCCH transmission if the subset of frequency resources is within the bandwidth part.

In one embodiment, the UE does not enable the interleaved mapping for the PUCCH transmission based on a maximum bandwidth of the UE being smaller than a bandwidth of the bandwidth part. For example, the maximum bandwidth may correspond to a maximum bandwidth that the UE is able to process.

In one embodiment, the UE does not enable the interleaved mapping for the PUCCH transmission if a maximum bandwidth of the UE is smaller than a bandwidth of the bandwidth part. For example, the maximum bandwidth may correspond to a maximum bandwidth that the UE is able to process.

In one embodiment, the interleaved mapping corresponds to an interleaved mapping for frequency hopping for uplink transmission (and/or the interleaved mapping is frequency hopping for uplink transmission).

Referring back to FIGS. 3 and 4, in one exemplary embodiment of a UE, the device 300 includes a program code 312 stored in the memory 310. The CPU 308 may execute program code 312 to enable the UE (i) to receive, from a base station, a configuration of a bandwidth part, (ii) to determine (e.g., derive) a subset of frequency resources (e.g., a subset of one or more frequency resources) within the bandwidth part, and (iii) to receive an indication of one or more allocated resources, within the subset of frequency resources, for a PUCCH transmission, wherein the UE does not enable interleaved mapping for the PUCCH transmission. Furthermore, the CPU 308 can execute the program code 312 to perform one, some and/or all of the above-described actions and steps and/or others described herein.

Figure 10:
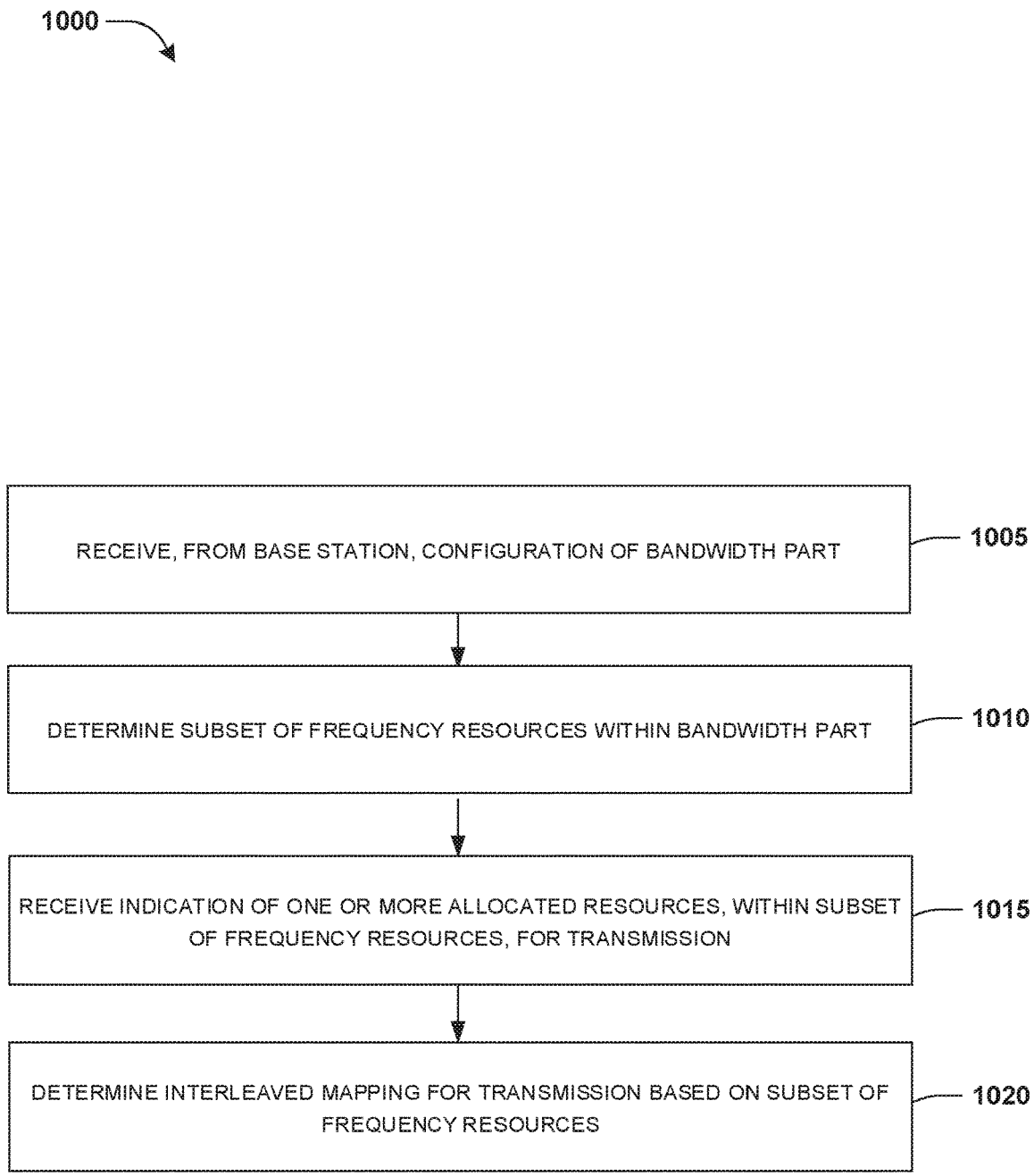
FIG. 10 is a flow chart according to one exemplary embodiment.

FIG. 10 is a flow chart 1000 according to one exemplary embodiment from the perspective of a UE. In step 1005, the UE receives, from a base station, a configuration of a bandwidth part. In step 1010, the UE determines (e.g., derives) a subset of frequency resources (e.g., a subset of one or more frequency resources) within the bandwidth part.

For example, the subset of frequency resources may be a subset of the bandwidth part (and/or a bandwidth of the subset of frequency resources may correspond to a portion of a bandwidth of the bandwidth part). In step 1015, the UE receives an indication of one or more allocated resources, within the subset of frequency resources, for a transmission. For example, the subset of frequency resources may comprise the one or more allocated resources (and/or the subset of frequency resources may comprise one or more frequency resources of the one or more allocated resources). Alternatively and/or additionally, the indication may allocate the one or more allocated resources for the transmission. In step 1020, the UE determines (e.g., derives) an interleaved mapping for the transmission based on the subset of frequency resources.

In one embodiment, the UE uses the interleaved mapping to perform the transmission (and/or the UE performs the transmission based on the interleaved mapping and/or the one or more allocated resources). For example, one or more second resources for the transmission may be determined based upon the interleaved mapping and the one or more allocated resources (e.g., the one or more allocated resources may be mapped to the one or more second resources according to the interleaved mapping). The transmission may be performed using the one or more second resources.

In one embodiment, the interleaved mapping is based on a size of the subset of frequency resources.

In one embodiment, the interleaved mapping is based on a starting location of the subset of frequency resources.

In one embodiment, one or more allocated PRBs after the interleaved mapping is determined (and/or applied) are within the subset of frequency resources. For example, one or more PRBs, within the subset of frequency resources, are allocated to the UE after determining (and/or applying) the interleaved mapping. For example, after the interleaved mapping is determined and/or applied (and/or when the interleaved mapping is applied and/or used by the UE), PRBs that are within the subset of frequency resources may be allocated to the UE (for use in performing one or more uplink transmissions and/or one or more downlink transmissions, for example) and/or PRBs that are outside the subset of frequency resources may not be allocated to the UE.

In one embodiment, the subset of frequency resources defines (e.g., limits and/or confines) an allocated bandwidth of the UE after determining (and/or applying) the interleaved mapping. For example, after the interleaved mapping is determined and/or applied (and/or when the interleaved mapping is applied and/or used by the UE), the subset of frequency resources is used to define (e.g., limit and/or confine) an allocated bandwidth (e.g., a bandwidth of the allocated bandwidth), such as a bandwidth allocated to the UE. For example, the allocated bandwidth may be defined by (e.g., limited and/or confined to within) a bandwidth of the subset of frequency resources.

In one embodiment, the transmission is a PUCCH transmission.

In one embodiment, the transmission is a PUSCH transmission.

In one embodiment, the interleaved mapping is for frequency hopping for uplink transmission (and/or the interleaved mapping is frequency hopping for uplink transmission).

In one embodiment, the determining (e.g., deriving) the interleaved mapping (for the transmission) based on the subset of frequency resources is performed based on (e.g., in response to) the determining (e.g., deriving) the subset of frequency resources within the bandwidth part. For example, the determining (e.g., deriving) the interleaved mapping (for the transmission) based on the subset of frequency resources is performed based on the subset of frequency resources being within the bandwidth part. For example, the determining (e.g., deriving) the interleaved mapping (for the transmission) is performed based on the subset of frequency resources in response to the subset of frequency resources being within the bandwidth part.

In one embodiment, the determining (e.g., deriving) the interleaved mapping (for the transmission) based on the subset of frequency resources is performed if the UE determines (e.g., derives) the subset of frequency resources within the bandwidth part. For example, the determining (e.g., deriving) the interleaved mapping (for the transmission) based on the subset of frequency resources is performed if the subset of frequency resources is within the bandwidth part. For example, the determining (e.g., deriving) the interleaved mapping (for the transmission) is performed based on the subset of frequency resources if the subset of frequency resources is within the bandwidth part.

In one embodiment, the determining (e.g., deriving) the interleaved mapping (for the transmission) based on the subset of frequency resources is performed based on a maximum bandwidth of the UE being smaller than a bandwidth of the bandwidth part. For example, the determining (e.g., deriving) the interleaved mapping (for the transmission) is performed based on the subset of frequency resources in response to a determination that a maximum bandwidth of the UE is smaller than a bandwidth of the bandwidth part. For example, the maximum bandwidth may correspond to a maximum bandwidth that the UE is able to process.

In one embodiment, the determining (e.g., deriving) the interleaved mapping (for the transmission) based on the subset of frequency resources is performed if a maximum bandwidth of the UE is smaller than a bandwidth of the bandwidth part. For example, the determining (e.g., deriving) the interleaved mapping (for the transmission) is performed based on the subset of frequency resources if a maximum bandwidth of the UE is smaller than a bandwidth of the bandwidth part. For example, the maximum bandwidth may correspond to a maximum bandwidth that the UE is able to process.

Referring back to FIGS. 3 and 4, in one exemplary embodiment of a UE, the device 300 includes a program code 312 stored in the memory 310. The CPU 308 may execute program code 312 to enable the UE (i) to receive, from a base station, a configuration of a bandwidth part, (ii) to determine (e.g., derive) a subset of frequency resources (e.g., a subset of one or more frequency resources) within the bandwidth part, (iii) to receive an indication of one or more allocated resources, within the subset of frequency resources, for a transmission, and (iv) to determine (e.g., derive) an interleaved mapping for the transmission based on the subset of frequency resources. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 6-10. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 6-10, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a base station). The increased efficiency may be a result of enabling the UE to perform interleaved mapping over a cell with larger bandwidth (and/or more efficiently perform interleaved mapping over a cell with larger bandwidth). Alternatively and/or additionally, the increased efficiency may be a result of enabling the UE (and/or the base station) to disable interleaved mapping for communication between the UE and the base station (such as in a situation in which a bandwidth of a bandwidth part of the UE is larger than a maximum bandwidth of the UE).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-read-

The invention claimed is:

1. A method of a base station, the method comprising:
    transmitting, to a User Equipment (UE), a configuration of a bandwidth part;
    determining a subset of frequency resources within the bandwidth part;
    determining one or more allocated resources that are a portion, but not an entirety, of the subset of frequency resources determined within the bandwidth part for which the configuration was transmitted; and
    transmitting, to the UE, an indication of one or more allocated resources, within the subset of frequency resources, for a transmission, wherein the base station is prohibited from enabling interleaved mapping for the transmission.

2. The method of claim 1, comprising:
    disabling the interleaved mapping for the transmission based on the subset of frequency resources being within the bandwidth part associated with the configuration transmitted to the UE.

3. The method of claim 1, comprising:
    disabling the interleaved mapping for the transmission based on a maximum bandwidth of the UE being smaller than a bandwidth of the bandwidth part associated with the configuration transmitted to the UE.

4. The method of claim 1, wherein:
    the transmission is a Physical Uplink Shared Channel (PUSCH) transmission.

5. The method of claim 1, wherein:
    the transmission is a Physical Uplink Control Channel (PUCCH) transmission.

6. The method of claim 1, wherein:
    the interleaved mapping corresponds to an interleaved mapping for frequency hopping for uplink transmission.

7. The method of claim 6, wherein:
    the frequency hopping is intra-slot frequency hopping.

8. A method of a User Equipment (UE), the method comprising:
    receiving, from a base station, a configuration of a bandwidth part; and
    determining a subset of frequency resources within the bandwidth part; and
    receiving an indication of one or more allocated resources, within the subset of frequency resources, for a Physical Uplink Control Channel (PUCCH) transmission, wherein the UE is prohibited from enabling interleaved mapping for the PUCCH transmission, wherein the one or more allocated resources are a portion, but not an entirety, of the subset of frequency resources determined within the bandwidth part for which the configuration was received.

9. The method of claim 8, wherein:
    disabling the interleaved mapping for the PUCCH transmission based on the subset of frequency resources being within the bandwidth part.

10. The method of claim 8, wherein:
    disabling the interleaved mapping for the PUCCH transmission based on a maximum bandwidth of the UE being smaller than a bandwidth of the bandwidth part.

11. The method of claim 8, wherein:
    the interleaved mapping corresponds to an interleaved mapping for frequency hopping for uplink transmission.

12. A method of a User Equipment (UE), the method comprising:
    receiving, from a base station, a configuration of a bandwidth part;
    determining a subset of frequency resources within the bandwidth part;
    receiving an indication of one or more allocated resources, within the subset of frequency resources, for a transmission, wherein the one or more allocated resources are a portion, but not an entirety, of the subset of frequency resources determined within the bandwidth part for which the configuration was received; and
    determining an interleaved mapping for the transmission based on the subset of frequency resources, wherein after the determining the interleaved mapping, the UE is prohibited from enabling interleaved mapping for a second transmission.

13. The method of claim 12, wherein:
    the interleaved mapping is based on a size of the subset of frequency resources.

14. The method of claim 12, wherein:
    the interleaved mapping is based on a starting location of the subset of frequency resources.

15. The method of claim 12, wherein:
    one or more Physical Resource Blocks (PRBs), within the subset of frequency resources, are allocated to the UE after determining the interleaved mapping.

16. The method of claim 12, wherein:
    the subset of frequency resources defines an allocated bandwidth of the UE after determining the interleaved mapping.

17. The method of claim 12, wherein:
    the transmission is a Physical Uplink Control Channel (PUCCH) transmission.

18. The method of claim 12, wherein:
    the transmission is a Physical Uplink Shared Channel (PUSCH) transmission.

19. The method of claim 12, wherein:
    the interleaved mapping is for frequency hopping for uplink transmission.

20. The method of claim 12, wherein:
    the determining the interleaved mapping based on the subset of frequency resources is performed based on the subset of frequency resources being within the bandwidth part.

21. The method of claim 12, wherein:
    the determining the interleaved mapping based on the subset of frequency resources is performed based on a maximum bandwidth of the UE being smaller than a bandwidth of the bandwidth part.

* * * * *